United States Patent
Matsuzaki

(10) Patent No.: US 8,170,377 B2
(45) Date of Patent: May 1, 2012

(54) IMAGE PROCESSING APPARATUS, CONTROL METHOD OF IMAGE PROCESSING APPARATUS, PROGRAM, AND STORAGE MEDIUM

(75) Inventor: Masanori Matsuzaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 12/270,914

(22) Filed: Nov. 14, 2008

(65) Prior Publication Data

US 2009/0136124 A1 May 28, 2009

(30) Foreign Application Priority Data

Nov. 28, 2007 (JP) .................................. 2007-307895

(51) Int. Cl.
*G06K 9/32* (2006.01)
*G06K 9/00* (2006.01)
(52) U.S. Cl. ........................................ 382/300; 382/162
(58) Field of Classification Search ........... 382/100–317
See application file for complete search history.

(56) References Cited

U.S. PATENT DOCUMENTS

| | | | |
|---|---|---|---|
| 5,712,890 A * | 1/1998 | Spivey et al. ..................... 378/37 |
| 5,886,353 A * | 3/1999 | Spivey et al. ............. 250/370.09 |
| 6,219,099 B1 * | 4/2001 | Johnson et al. ................ 348/383 |
| 6,804,406 B1 * | 10/2004 | Chen .............................. 382/254 |
| 6,985,637 B1 * | 1/2006 | Gindele ......................... 382/274 |
| 7,015,951 B1 * | 3/2006 | Yoshigahara et al. ... 348/207.99 |
| 7,060,445 B1 * | 6/2006 | Dunlay et al. .................. 435/7.1 |
| 7,097,270 B2 * | 8/2006 | Yamazaki ........................ 347/19 |
| 7,348,993 B2 * | 3/2008 | Stokes et al. .................. 345/589 |
| 7,702,229 B2 * | 4/2010 | Schilling-Benz et al. .... 396/111 |
| 2001/0033387 A1 * | 10/2001 | Nogiwa et al. ................. 358/1.9 |
| 2007/0127066 A1 | 6/2007 | Haba ............................ 358/1.15 |
| 2007/0263237 A1 | 11/2007 | Robinson ....................... 358/1.9 |

FOREIGN PATENT DOCUMENTS

| EP | 0 893 753 A2 | 1/1999 |
|---|---|---|
| JP | 2006-168200 | 6/2006 |

* cited by examiner

*Primary Examiner* — Manav Seth

(74) *Attorney, Agent, or Firm* — Fitzpatrick, Cella, Harper & Scinto

(57) ABSTRACT

An image processing apparatus includes an interpolation unit (205, S708) which interpolates, based on the result of forming an image when executing calibration and the result of forming an image after executing calibration, the fluctuation amount of the image quality of each of image forming devices capable of outputting image data, a calculation unit (205, S710) which calculates, for each of the image forming devices on the basis of the interpolation result, the fluctuation amount of the image quality for image data to be output, a determination unit (205, S711) which determines the priority order of the image forming devices as output destinations of the image data on the basis of calculation results, and a display unit (205, S712) which displays a list of image forming devices selectable from the image forming devices in accordance with the determined priority order.

17 Claims, 22 Drawing Sheets

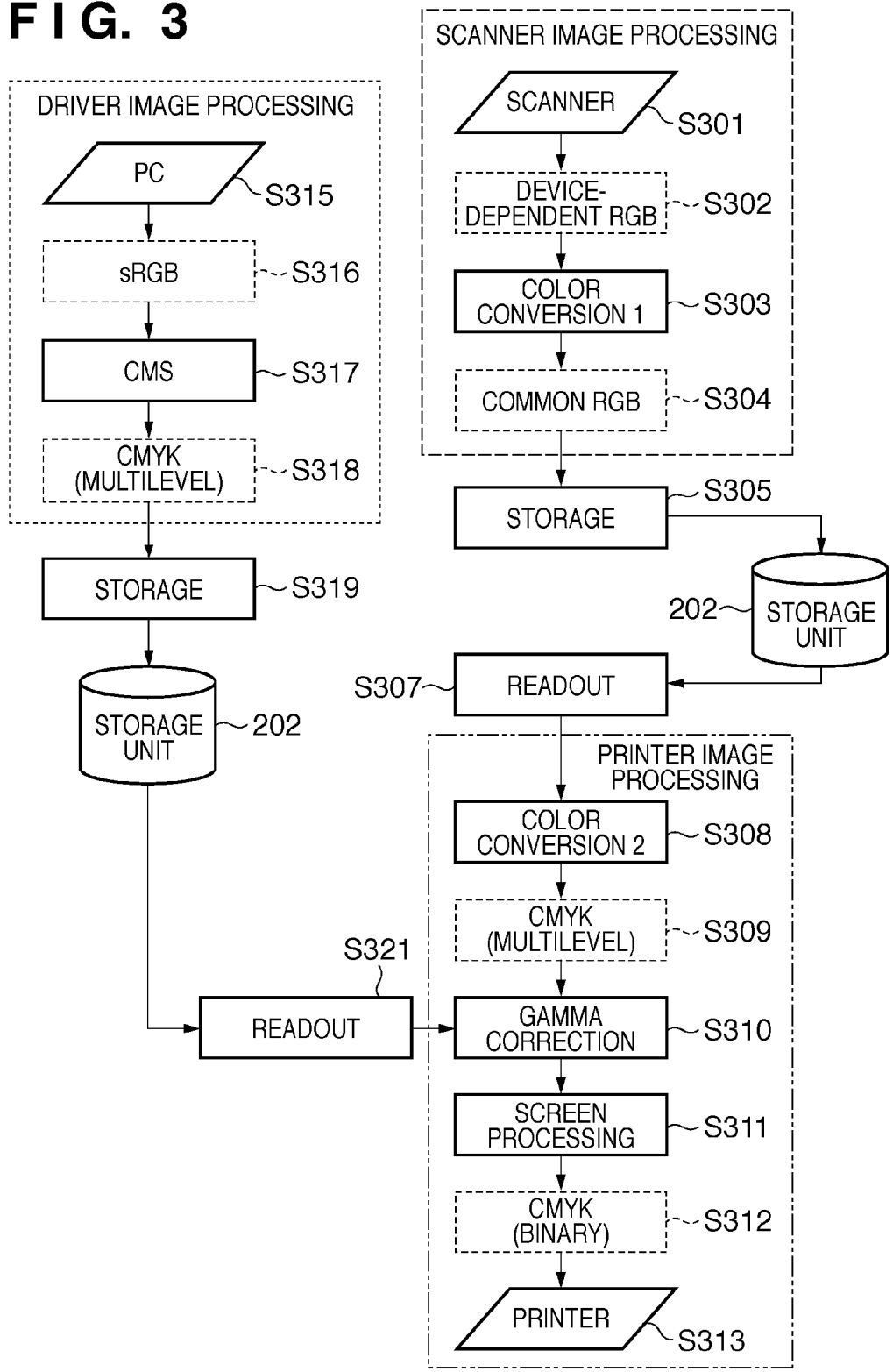

CYAN  MAGENTA

CYAN  MAGENTA

| INPUT | | | OUTPUT | | |
|---|---|---|---|---|---|
| R | G | B | $L^*$ | $A^*$ | $B^*$ |
| 0 | 0 | 0 | 10 | 0 | 0 |
| 0 | 0 | 17 | 10 | 0 | 20 |
| ⋮ | | | ⋮ | | |
| 153 | 204 | 51 | 5 | 15 | 20 |
| ⋮ | | | ⋮ | | |
| 204 | 255 | 0 | 15 | 30 | 10 |
| 255 | 255 | 255 | 0 | 0 | 0 |

FIG. 10

| INPUT | | | OUTPUT | | |
| --- | --- | --- | --- | --- | --- |
| R | G | B | L* | A* | B* |
| 0 | 0 | 0 | 6 | 0 | 0 |
| 0 | 0 | 17 | 6 | 0 | 12 |
| : | | | : | | |
| 153 | 204 | 51 | 3 | 9 | 12 |
| : | | | : | | |
| 204 | 255 | 0 | 9 | 18 | 6 |
| 255 | 255 | 255 | 0 | 0 | 0 |

| INPUT | | | OUTPUT | | |
|---|---|---|---|---|---|
| R | G | B | L* | A* | B* |
| 0 | 0 | 0 | 10 | 0 | 0 |
| 0 | 0 | 17 | 10 | 0 | 20 |
| : | | | : | | |
| 153 | 204 | 51 | 5 | 15 | 20 |
| : | | | : | | |
| 204 | 255 | 0 | 15 | 30 | 10 |
| : | | | : | | |
| 255 | 255 | 0 | 10 | 0 | 20 |
| : | | | : | | |
| 255 | 255 | 255 | 0 | 0 | 0 |

1202

| INPUT | | | OUTPUT | | |
|---|---|---|---|---|---|
| R | G | B | L* | A* | B* |
| 0 | 0 | 0 | 15 | 0 | 0 |
| 0 | 0 | 17 | 5 | 0 | 10 |
| : | | | : | | |
| 153 | 204 | 51 | 15 | 25 | 30 |
| : | | | : | | |
| 204 | 255 | 0 | 20 | 25 | 15 |
| : | | | : | | |
| 255 | 255 | 0 | 100 | 256 | 256 |
| : | | | : | | |
| 255 | 255 | 255 | 0 | 0 | 0 |

F I G. 13

| REMOTE COPYING | | | ~1301 |
|---|---|---|---|
| SELECT DEVICE FOR REMOTE COPYING | | | |
| | COLOR REPRODUCIBILITY LEVEL | COLOR REPRODUCTION CAPABILITY | |
| DEVICE B | HIGH | CAPABLE | |
| DEVICE C | LOW | INCAPABLE | |
| DEVICE A | LOW | INCAPABLE | |
| | | EXECUTE | |

FIG. 16

| REMOTE COPYING | | | ~1601 |
|---|---|---|---|
| SELECT DEVICE FOR REMOTE COPYING | | | |
| | COLOR REPRODUCIBILITY LEVEL | NUMBER OF OUTPUT SHEETS | |
| DEVICE B | HIGH | 70 SHEETS | |
| DEVICE C | HIGH | 30 SHEETS | |
| DEVICE A | LOW | 15 SHEETS | |
| | | EXECUTE | |

FIG. 18

REMOTE COPYING

SELECT COLOR TO BE REPRODUCED — 1801

COLOR TO BE REPRODUCED

| | |
|---|---|
| LIGHT RED | ☐ |
| DARK RED | ☐ |
| LIGHT GREEN | ☑ |
| DARK GREEN | ☐ |
| LIGHT BLUE | ☑ |
| DARK BLUE | ☐ |
| LIGHT CYAN | ☑ |
| DARK CYAN | ☐ |
| LIGHT MAGENTA | ☐ |
| DARK MAGENTA | ☐ |
| LIGHT YELLOW | ☐ |
| DARK YELLOW | ☐ |
| LIGHT BLACK | ☐ |
| DARK BLACK | ☐ |

EXECUTE — 1802

FIG. 20

| | COLOR CANDIDATE (RGB) | COLOR CANDIDATE 2 (RGB) | COLOR CANDIDATE 3 (RGB) |
|---|---|---|---|
| LIGHT RED | (255, 240, 240) | (255, 220, 220) | (255, 200, 200) |
| DARK RED | (255, 50, 50) | (255, 20, 20) | (255, 0, 0) |
| ⋮ | ⋮ | ⋮ | ⋮ |
| LIGHT BLACK | (240, 240, 240) | (220, 220, 220) | (200, 200, 200) |
| DARK BLACK | (20, 20, 20) | (40, 40, 40) | (60, 60, 60) |

| LUMINANCE VALUE | L* |
|---|---|
| 0 | 10 |
| 17 | 10 |
| ⋮ | |
| 119 | 5 |
| ⋮ | |
| 238 | 15 |
| 255 | 0 |

2101

IMAGE PROCESSING APPARATUS, CONTROL METHOD OF IMAGE PROCESSING APPARATUS, PROGRAM, AND STORAGE MEDIUM

BACKGROUND OF THE INVENTION

1. Field of the Invention

The present invention relates to an image processing technique.

2. Description of the Related Art

An electrophotographic device using toner is readily influenced by temporal change. Even a high-end device which features high color reproducibility, when not used for a prolonged period of time, becomes poorer than a new office device in terms of color reproducibility. To solve this problem, the user of a conventional device executes calibration at an arbitrary time point to perform color correction for absorbing the fluctuation amount of color reproducibility upon a temporal change. However, even when performing color correction by calibration, the user cannot determine the timing to perform calibration.

To specify the timing to execute calibration, there is a technique of recording the time when calibration was done, and obtaining the time elapsed after the previous calibration and the fluctuation amount of color reproducibility. For example, Japanese Patent Laid-Open No. 2006-168200 proposes a technique of prompting the user to execute calibration in accordance with the elapsed time and the fluctuation amount of color reproducibility.

Electrophotographic devices have recently been developed to be affordable and compact. It is increasingly becoming popular to introduce a plurality of devices into one office. At the same time, the development of the network technology makes it possible to build a system which allows the user to freely select an output device.

However, a conventional network environment is premised on that the user performs processing at an arbitrary timing. A device selected by the user to output data may not always achieve optimum color reproducibility. Especially the fluctuation amount upon a temporal change differs between devices. Even a high-end device having excellent color reproducibility may suffer a large fluctuation amount of color. Even an office device poorer in color reproducibility than a high-end device may exhibit a small fluctuation amount of color.

The fluctuation amount in each device differs for each color. An electrophotographic device uses, for example, different, cyan, magenta, yellow, and black coloring materials, and the degree of deterioration upon a temporal change is also different for each. For a mixture of these coloring materials, the fluctuation amount further changes from that of a single color. Since the fluctuation amount of a device differs for each color it uses, the best device for printing a particular document changes depending on the color distribution of the document.

For this reason, the user can neither know a device optimum for document copying or data output, nor effectively utilize network resources.

SUMMARY OF THE INVENTION

It is an object of the present invention to provide an image processing technique that is capable of quantitatively evaluating a device suited to output data, and effectively utilizing resources.

According to one aspect of the present invention, there is provided an image processing apparatus comprising:

an interpolation unit configured to interpolate an image quality fluctuation amount for each of a plurality of image forming devices capable of outputting image data, based on a result of forming an image when executing calibration and a result of forming an image after executing calibration;

a calculation unit configured to calculate, for each of the plurality of image forming devices on the basis of the interpolation result of the interpolation unit, an image quality fluctuation amount for image data to be output;

a determination unit configured to determine a priority order of the plurality of image forming devices as output destinations of the image data on the basis of the calculated image quality fluctuation amounts; and a display unit configured to display a list of image forming devices selectable from the plurality of image forming devices in accordance with the priority order determined by the determination unit.

According to another aspect of the present invention, there is provided an image processing apparatus which is connectable to a plurality of image forming apparatuses via a network and which is operable to transmit image data to one of the plurality of image forming apparatuses, the image processing apparatus comprising:

an extraction unit configured to extract a color with high frequency of appearance from the image data;

a calculation unit configured to calculate, by using fluctuation amounts of tint of each color in the plurality of image forming apparatuses a reference time after executing calibration in the plurality of image forming apparatuses, and a time elapsed after calibration, a fluctuation amount of tint for each of the plurality of image forming apparatuses at a timing to transmit the image data; and a display unit configured to display a fluctuation amount of a color with high frequency of appearance by using the fluctuation amount calculated by the calculation unit.

According to still another aspect of the present invention, there is provided a control method of an image processing apparatus, the method comprising:

interpolating, based on a result of forming an image when executing calibration and a result of forming an image after executing calibration, a fluctuation amount of image quality of each of a plurality of image forming devices capable of outputting image data;

calculating, for each of the plurality of image forming devices on the basis of the interpolation result of the interpolation step, a fluctuation amount of image quality for image data to be output;

determining a priority order of the plurality of image forming devices as output destinations of the image data on the basis of calculation results of the calculation step; and displaying a list of image forming devices selectable from the plurality of image forming devices in accordance with the priority order determined in the determination step.

According to yet another aspect of the present invention, there is provided a control method of an image processing apparatus which is connected to a plurality of image forming apparatuses via a network and transmits image data to one of the plurality of image forming apparatuses, the method comprising:

extracting a color with high frequency of appearance from the image data;

calculating a fluctuation amount of tint for each of the plurality of image forming apparatuses at a timing to transmit the image data, by using fluctuation amounts of tint of each color in the plurality of image forming apparatuses a reference time after executing calibration in the plurality of image forming apparatuses, and a time elapsed after calibration; and displaying a fluctuation amount of a color with high frequency of appearance by using the fluctuation amount calculated in the calculation step.

The present invention can quantitatively evaluate a device suited to output data, and effectively utilize resources.

Further features of the present invention will become apparent from the following description of exemplary embodiments with reference to the attached drawings.

BRIEF DESCRIPTION OF THE DRAWINGS

FIG. 3 is a flowchart for explaining the sequence of scanner image processing, printer image processing, and driver image processing;

FIG. 8 is a table exemplifying a device fluctuation amount LUT in the first embodiment;

FIG. 10 is a table exemplifying a new device fluctuation amount LUT three days after calculation;

FIG. 12 is a table exemplifying the device fluctuation amount LUTs of a high-end device and office device;

FIG. 13 is a view exemplifying a UI window displayed by processing of S1413;

FIG. 16 is a view exemplifying a UI window displayed by processing of S1524;

FIG. 18 is a view exemplifying a UI window which allows the user to designate a color that puts importance on reproducibility before executing scanning;

FIG. 20 is a table exemplifying a table which stores a plurality of color candidate data;

FIG. 21 is a table exemplifying a single-color device fluctuation amount LUT.

DESCRIPTION OF THE EMBODIMENTS

Preferred embodiments of the present invention will be exemplified in detail below with reference to the accompanying drawings. Components set forth in these embodiments are merely examples. The technical scope of the present invention should be determined by the appended claims and is not limited to the individual embodiments to be described below.

Figure 1:
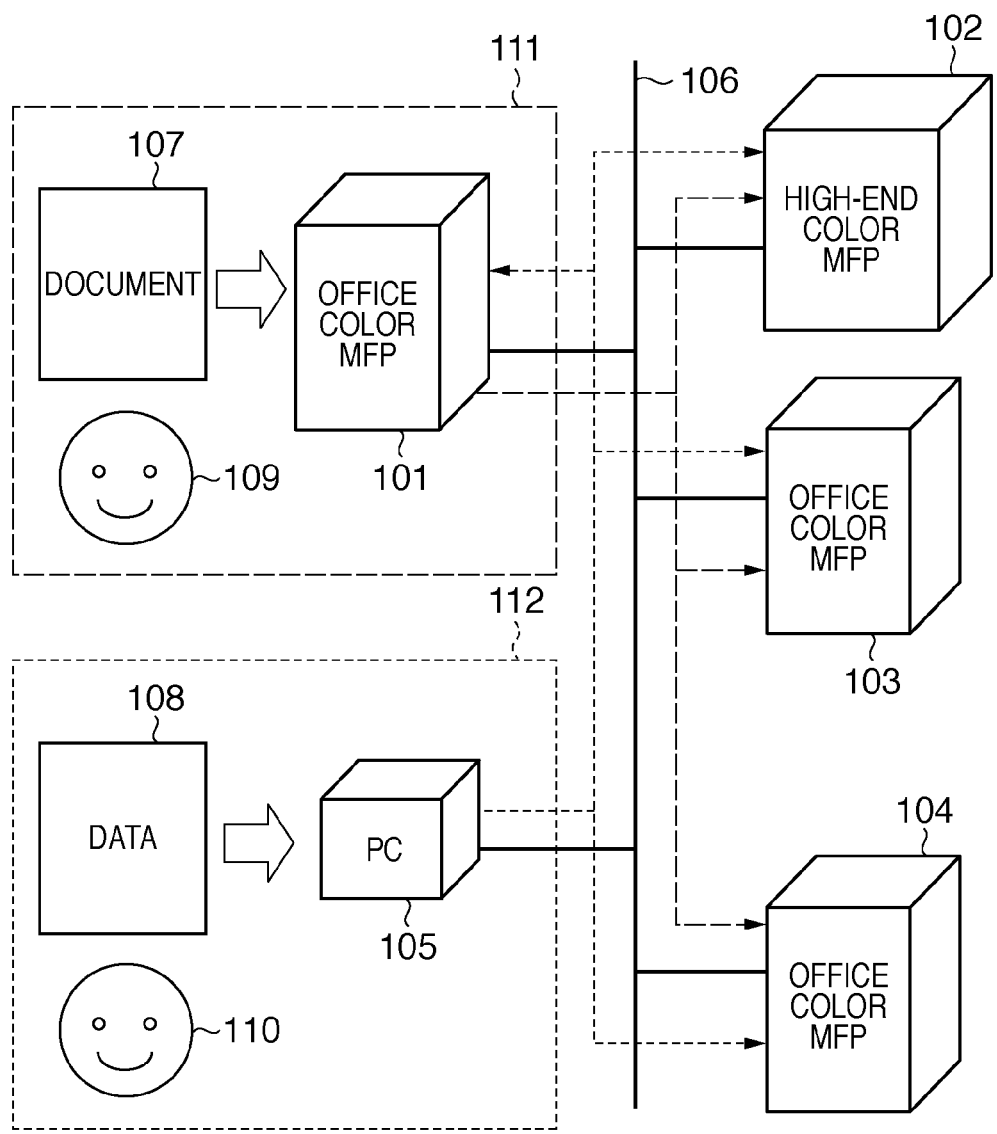
FIG. 1 is a block diagram showing the configuration of a system in which a plurality of color multi-function peripherals are connected to a network.

FIG. 1 is a block diagram showing the configuration of a system in which a plurality of color multi-function peripherals (MFPs) are connected to a network. An office color MFP 101, a high-end color MFP 102, an office color MFP 103, an office color MFP 104, and an information processing apparatus (PC) 105 are connected to a network 106. This system allows the user to use a remote copying environment 111 and a driver output environment 112.

In the remote copying environment 111, for example, a document 107 is scanned using the scanner function of the office color MFP 101. The data of the scanned document 107 can be output to the high-end color MFP 102, office color MFP 103, and office color MFP 104.

In the driver output environment 112, for example, data 108 can be output to the office color MFP 101 using the printer driver of the PC 105. The data 108 can also be output to the high-end color MFP 102, office color MFP 103, and office color MFP 104 using the printer driver of the PC 105.

An image processing apparatus or the like according to embodiments of the present invention is applicable to an image forming apparatus such as the office color MFP 101, high-end color MFP 102, office color MFP 103, or office color MFP 104.

First Embodiment

The first embodiment will describe processing targeted for color MFPs to display image forming devices (to be simply referred to as "devices" hereinafter) in the ascending order of fluctuation amount of the image quality in remote copying.

Figure 2:
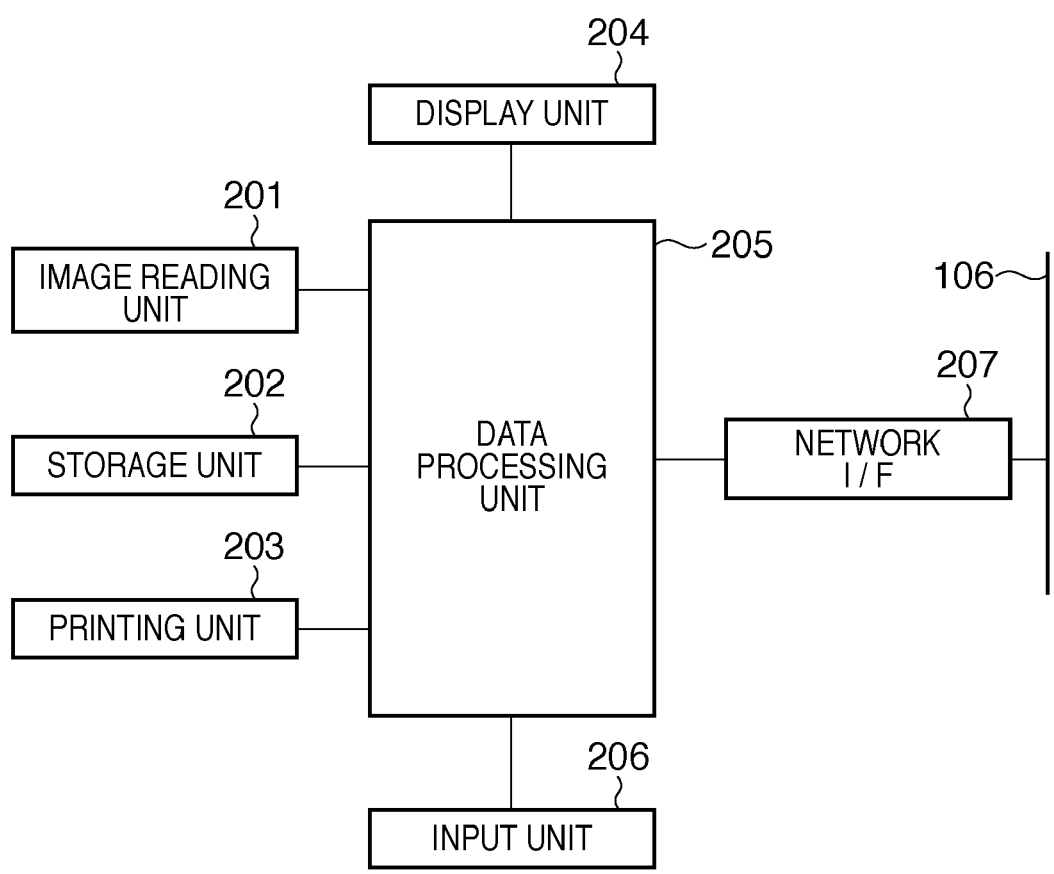
FIG. 2 is a block diagram showing the functional arrangement of a color MFP.

FIG. 2 is a block diagram showing the functional arrangement of a color MFP. In FIG. 2, an image reading unit 201 including an auto document feeder irradiates one or a plurality of document image with light emitted from a light source (not shown). The image reading unit 201 forms a reflected image based on reflected light from the document image on an image sensor via a lens. The image reading unit 201 obtains, as image information, a raster image read signal (image signal) from the image sensor.

A data processing unit 205 executes various image processes on the basis of the image signal, and converts the image signal into a print signal for forming an image. Upon receiving the print signal from the data processing unit 205, a printing unit 203 forms an image on a print sheet on the basis of the print signal, and outputs it. This sequence is the copy operation of a general copy function. When the printing unit 203 is a color MFP, it can execute image formation using C, M, Y, and K coloring materials. The printing unit 203 executes an image forming operation on the basis of data (print signal) processed by the data processing unit 205. The purpose of the present invention is not limited to a color MFP, and the present invention is similarly applicable to even a monochrome MFP.

The user can operate the color MFP via an input unit 206 serving as the key operation unit of the color MFP. An instruction accepted by the input unit 206 from the user is input to the data processing unit 205. In accordance with the instruction accepted by the input unit 206 from the user, the data processing unit 205 can control print signal conversion processing for image formation. The data processing unit 205 comprises a CPU (not shown) which can function as a control means. The CPU can manage and control the operation of the color MFP as a whole.

A display unit 204 can display information on the state of the color MFP, the necessity of calibration, the status display of an operation input, and image data (color image data and monochrome image data) during processing. The CPU functions as a display control means for displaying various data on the display unit 204.

A storage unit 202 is an area where image data read by the image reading unit 201 and the like can be saved. In addition to image data, the storage unit 202 can store information on the calibration elapsed time, and a change (to be also referred to as a "fluctuation amount" hereinafter) of the image quality (e.g., the fluctuation amount of the tint) when the calibration elapsed time is used as a reference. Further, the storage unit 202 can function as the work area of the CPU. The storage unit 202 can also store the result of calculating a correction amount by the CPU. A network interface (I/F) 207 connects the color MFP to a network 106. The network interface (I/F) 207 allows receiving image data from an information processing apparatus and the like on the network. The data processing unit 205 processes image data received via the network interface (I/F) 207, and the printing unit 203 forms an image and prints it out.

Data which is obtained by reading a document 107 by the image reading unit 201 and processed by the data processing unit 205 can also be transmitted to an information processing apparatus on the network via the network I/F 207. When the remote copying environment is used, data which is obtained by reading the document 107 by the image reading unit 201 and processed by the data processing unit 205 is transmitted via the network I/F 207. The printing unit of another color MFP connected to the network 106 can also perform image forming processing.

(Scanner Image Processing)

Image processing executed by the data processing unit 205 will be explained with reference to FIG. 3. The data processing unit 205 receives image data (document) using a scanner serving as part of the image reading unit 201 (S301). Based on the image data, the data processing unit 205 acquires device-dependent R, G, and B data corresponding to each device model (S302).

In step S303, the data processing unit 205 performs color conversion processing 1 (first color conversion processing). In step S304, the data processing unit 205 converts the device-dependent R, G, and B data into device-independent common R, G, and B data. For example, the data processing unit 205 can convert device-dependent R, G, and B data into common R, G, and B data by converting the device-dependent R, G, and B data into the L*a*b* color space common to respective devices.

After the end of the color conversion processing, the data processing unit 205 stores the common R, G, and B data in the storage unit 202 in step S305. S301 to S304 concern processing of read image data, and will be generically defined as "scanner image processing".

(Printer Image Processing)

In step S307, the data processing unit 205 reads out the common R, G, and B data stored in the storage unit 202. In step S308, the data processing unit 205 executes color conversion processing 2 (second color conversion processing), generating C, M, Y, and K (multilevel) data (S309).

The data processing unit 205 performs gamma correction (S310) and screen processing (S311), generating C, M, Y, and K (binary) data (S312). The data processing unit 205 transmits the C, M, Y, and K (binary) data to the printing unit 203, and a printer which forms part of the printing unit 203 executes print processing (S313). The processes in S308 to S313 concern a printer which forms part of the printing unit 203, and S308 to S313 will be generically defined as "printer image processing".

(Driver Image Processing)

Although copy processing has been exemplified, the flow of driver output in an information processing apparatus (PC) will be explained in S315 to S318.

The PC generates image data in S315, and processes it as sRGB (standard RGB) (S316). A CMS (Color Management System) performs color conversion for the image data (S317), generating C, M, Y, and K (multilevel) data (S318). The storage unit 202 stores the generated C, M, Y, and K (multilevel) data (S319). The processes in S315 to S318 will be generically defined as "driver image processing".

The C, M, Y, and K (multilevel) data stored in the storage unit 202 are read out in S321, and undergo gamma correction (S310) and screening processing (S311) described in the printer image processing, generating C, M, Y, and K (binary) data (S312). The C, M, Y, and K (binary) data are transmitted to the printing unit 203, and the printer which forms part of the printing unit 203 executes print processing (S313).

When remote copying is executed from an office color MFP 101 to a high-end color MFP 102, scanner image processing is done for image data obtained by the scanner of the office color MFP 101 (S301 to S304). Common R, G, and B data generated by the scanner image processing are stored in the storage unit 202 of the high-end color MFP 102 (S305). The high-end color MFP 102 executes printer image processing for the common R, G, and B data, printing out the result of the printer image processing (S308 to S313).

(Calibration Processing)

Figure 4A:
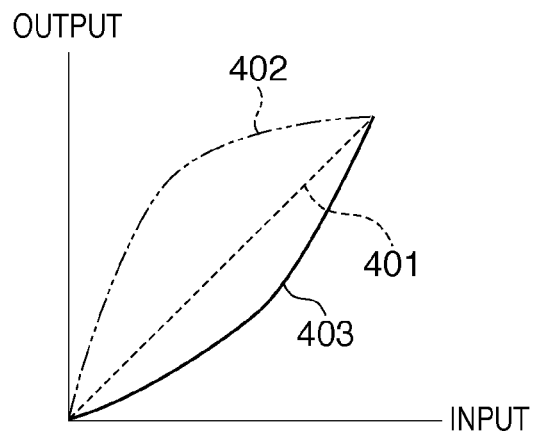
FIGS. 4A to 4C are views showing an outline of calibration.
Figure 4B:
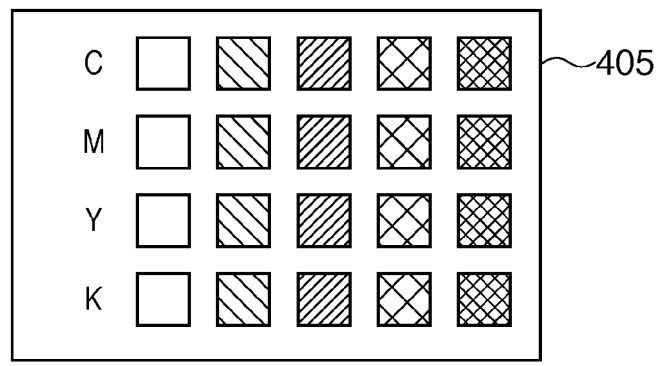
Figure 4C:
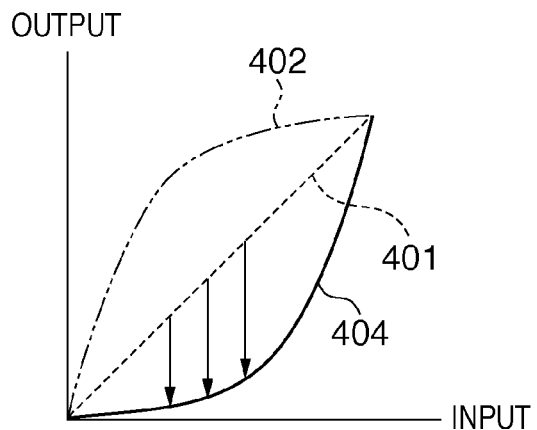

Calibration processing executed by the data processing unit 205 will be explained. FIGS. 4A to 4C are views for explaining calibration processing. FIGS. 4A and 4C are graphs showing the relationship between an input signal value and the density characteristic of a printout. C, M, Y, and K colors have independent relationships.

FIG. 4A is a graph for explaining the relationship between a signal value input before calibration and the density characteristic of a printout. Reference numeral 401 denotes a target (target value) characteristic. The density characteristic of an output is ideally linear with respect to an input signal value. Reference numeral 402 denotes an engine characteristic. Reference numeral 403 denotes a gamma correction characteristic used in gamma correction (S310) of FIG. 3. The gamma correction characteristic can be used as a gamma correction table 403 from which an output value (correction value) corresponding to an input value can be obtained. The gamma correction table 403 can be used to correct an output value corresponding to an input signal value and make an output density value close to the target 401.

In FIG. 4A, even if the output value of the current engine characteristic 402 is corrected based on the gamma correction table 403, the output of the engine characteristic 402 is still larger than the target 401. As a result, an image is formed with a density value larger than the target 401. The engine characteristic 402 fluctuates day by day over time. Even if the correction value of the gamma correction table 403 is adjusted at a given timing and gamma correction processing is executed later, the engine characteristic 402 cannot be so corrected as to come close to the target 401, and may move apart from the target contrary to user's intention. In this case, color reproducibility the user wants cannot be attained. If the effect of gamma correction (S310) is poor, calibration needs to be done.

FIG. 4B is a view exemplifying a calibration chart 405 in which gradation data divided at predetermined intervals are rendered for each of C, M, Y, and K colors. The data processing unit 205 controls the printing unit 203 to output the chart 405 from the printer. The chart 405 output from the printer is scanned by the scanner. The data processing unit 205 compares the obtained data with data corresponding to the target 401, generating a gamma correction table 403 in which the correction value is adjusted.

Figure 5:
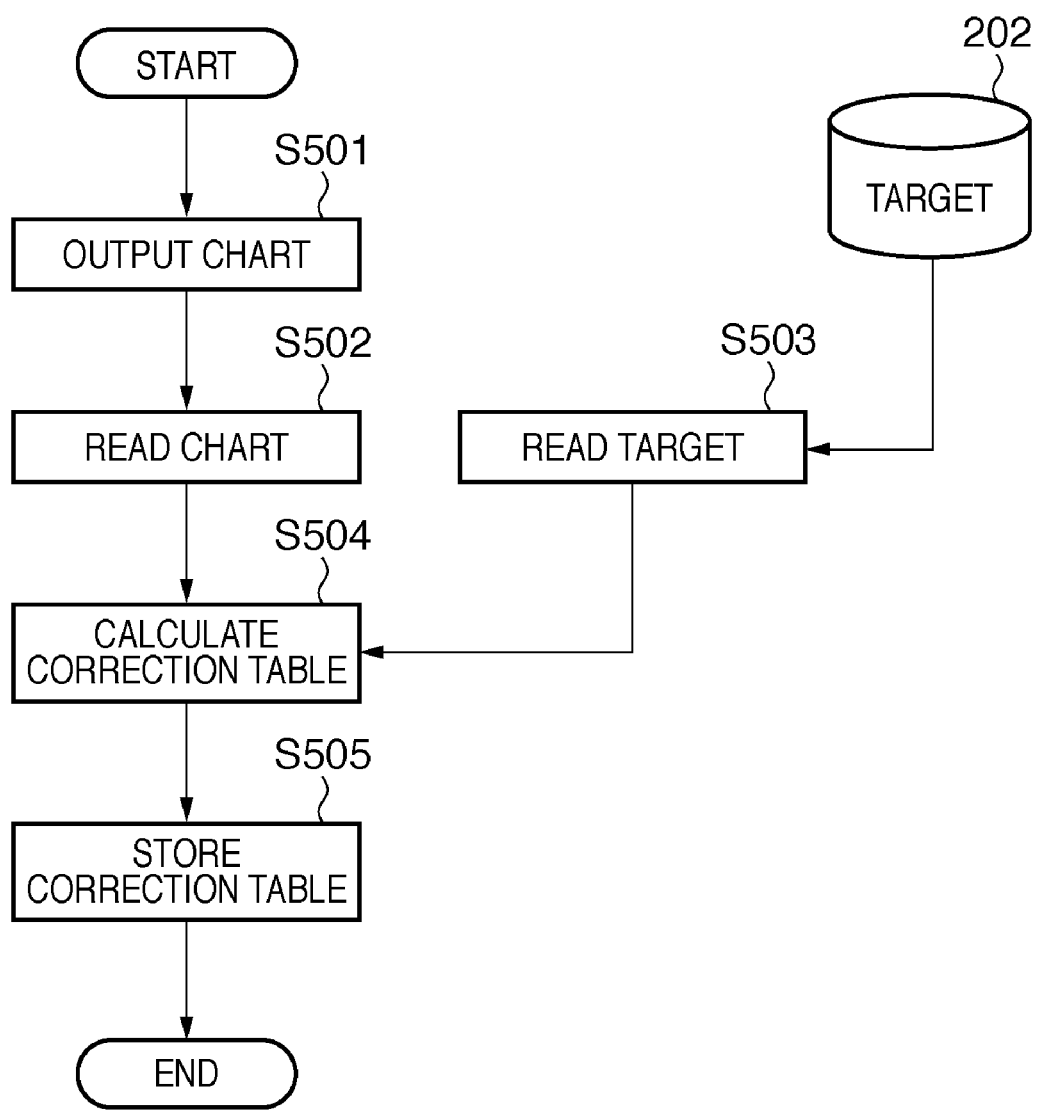
FIG. 5 is a flowchart for explaining the sequence of processing to generate a gamma correction table 403 by calibration.

FIG. 5 is a flowchart for explaining the sequence of processing to generate the gamma correction table 403 by calibration. This processing is executed under the control of the data processing unit 205.

In step S501, the data processing unit 205 controls the printing unit 203 to output the calibration chart 405 from the printer.

In step S502, the data processing unit 205 uses the scanner of the image reading unit 201 to scan the chart 405 output from the printer.

In step S503, the data processing unit 205 reads data of the target 401 stored in the storage unit 202.

In S504, the data processing unit 205 compares the data of the chart 405 with that of the target 401 to execute calculation for generating the gamma correction table 403 in which the correction value is adjusted.

In step S505, the data processing unit 205 stores the generated gamma correction table 403 in the storage unit 202. Since one gamma correction table 403 for each of C, M, Y, and K colors exists, the data processing unit 205 performs gamma correction table generation processing for each color. When executing image forming processing on the basis of printer image processing and driver image processing, the data processing unit 205 executes gamma correction using the gamma correction table 403 (S310).

In FIG. 4C, reference numeral 404 denotes a gamma correction table in which the correction value is adjusted. The output value of the current engine characteristic 402 is so corrected as to come close to the target 401 by superposition with the gamma correction table 404.

By executing this calibration processing, an image can be formed while the device state is close to the target.

A change (fluctuation amount) of the tint over time after calibration differs between colors. This is because four, C, M, Y, and K toners used in a color MFP generally have different characteristics. In addition, the fluctuation amount changes depending on the combination of the respective toners. As a result, the fluctuation amount of color changes for each specific color. Further, the fluctuation amount changes depending on the device type. This phenomenon arises from device-specific properties such as the difference in the fixing method of a color MFP. The fluctuation amount is not always linked to the image quality of a device. Even a high-end MFP with high image quality may suffer a larger fluctuation amount than that of an office color MFP with intermediate image quality.

Figure 6A:
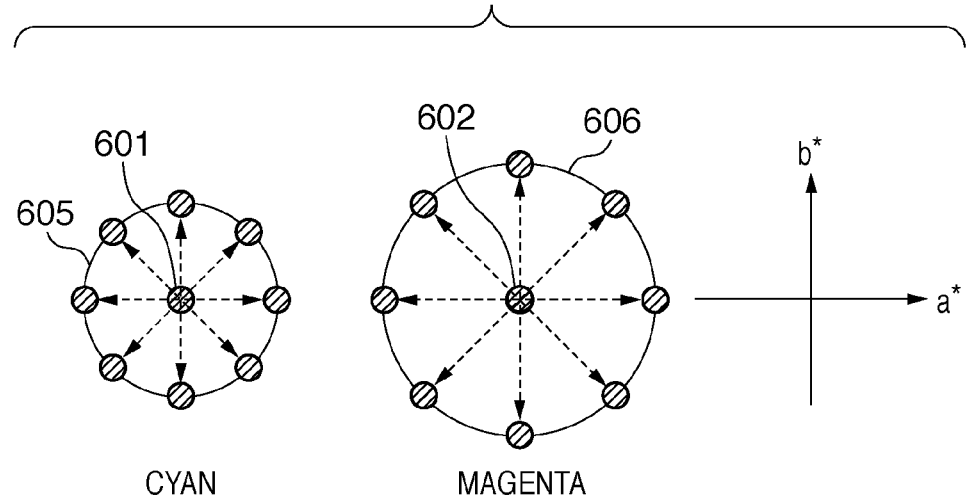
FIG. 6A is a view exemplifying a change of tint in a high-end color MFP.
Figure 6B:
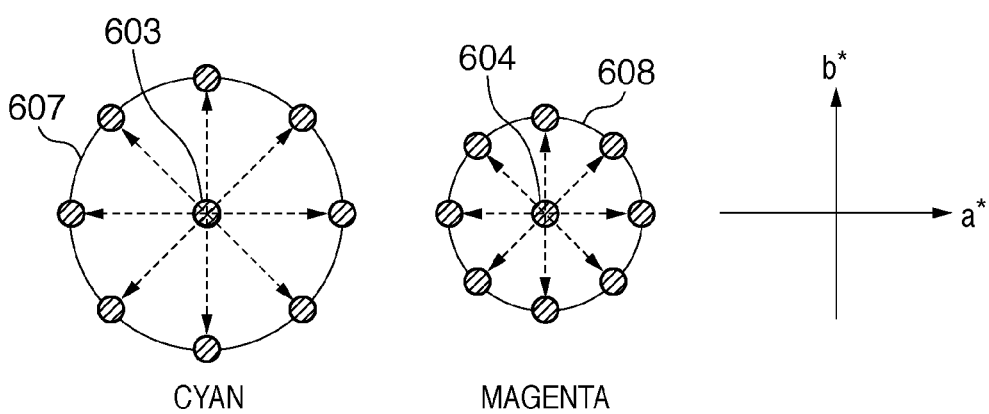
FIG. 6B is a view exemplifying a change of tint in an office color MFP.

The fluctuation amount changes for each device and each tint, and in addition, has no directionality. When the trend of fluctuation is represented in a device-independent color space L*a*b*, the tint does not always fluctuate with the same trend. In some cases, the fluctuation trends of color reproducibility may be completely opposite in a single device even the same time after calibration. FIGS. 6A and 6B are views for exemplarily explaining a change of the tint.

FIG. 6A is a view exemplifying a change of the tint in a high-end color MFP, and FIG. 6B is a view exemplifying a change of the tint in an office color MFP. FIGS. 6A and 6B show the a*b* plane in the L*a*b* color space. Center circles 601 to 604 represent the results of image formation when calibration is executed. Peripheral circles 605, 606, 607, and 608 schematically represent changes (fluctuation amounts) of the tint from the results of image formation a predetermined time after executing calibration. As shown in FIGS. 6A and 6B, the fluctuation amount of color reproducibility changes depending on the difference between cyan and magenta. As is apparent from a comparison between FIGS. 6A and 6B, the fluctuation amount of color reproducibility differs between a high-end MFP and office color MFP even for the same cyan or magenta. Circles each representing a change (fluctuation amount) of the tint over time after calibration are distributed in all directions from the center. As is apparent from this, the fluctuation amount of color reproducibility of a device generally has no directionality.

The fluctuation amount after executing calibration changes depending on the device model and the C, M, Y, and K tints. Even if calibration is uniformly done a predetermined time after calibration, no effective correction can be achieved.

(Quantization of Color Reproducibility)

The sequence of processing to quantitatively evaluate a change of the tint for each device, and prioritize a plurality of devices as image data output destinations will be explained with reference to FIGS. 7 and 8. Remote copying will be exemplified. In the arrangement shown in FIG. 1, when the office color MFP 101 serves as the data transmitting side, remote copying can be executed for one of the high-end color MFP 102 and office color MFPs 103 and 104 on the data receiving side.

Figure 7:
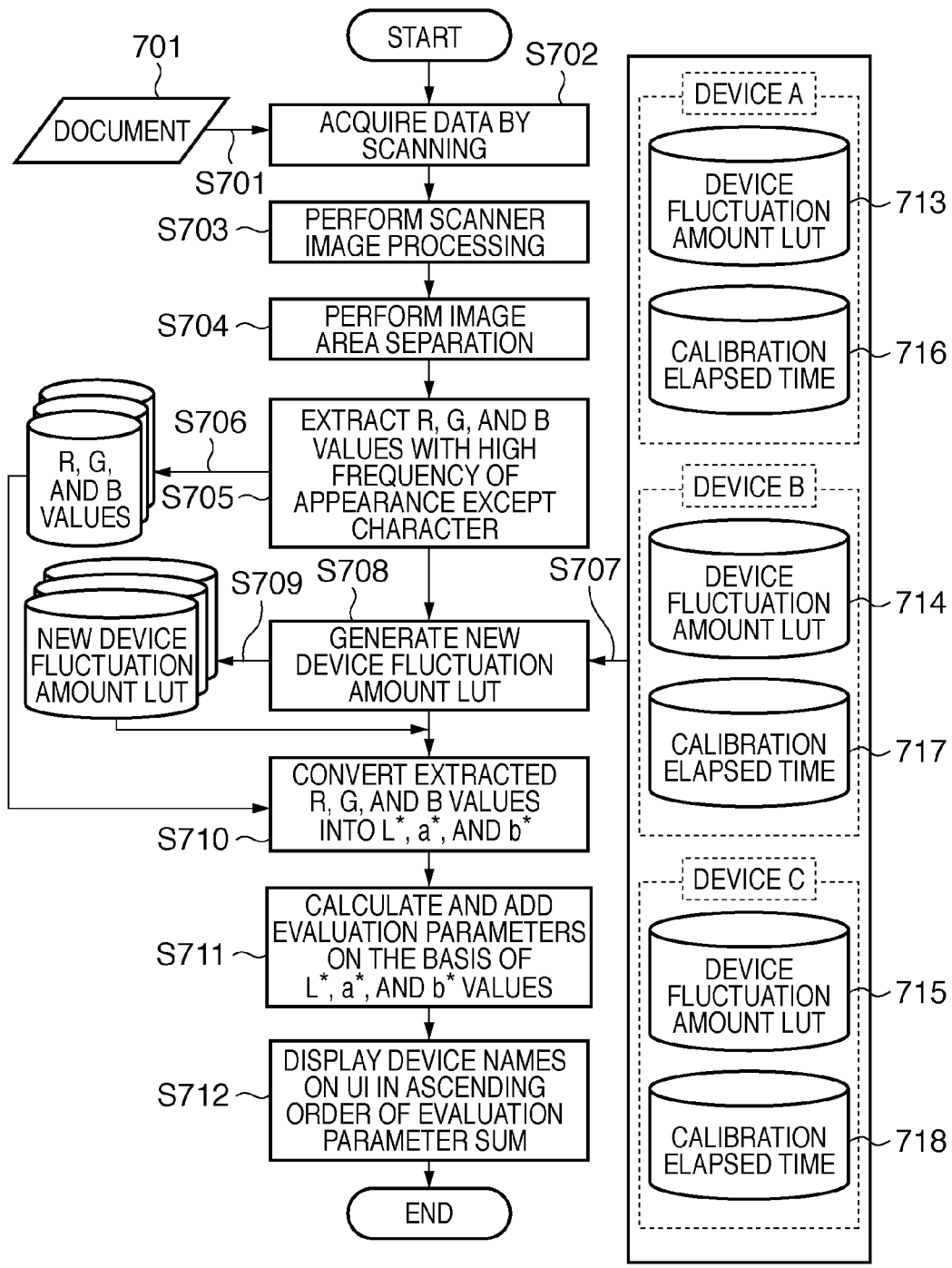
FIG. 7 is a flowchart for explaining the sequence of processing to quantitatively evaluate the fluctuation amount of color reproducibility for each device, and prioritize devices suited to output data.

FIG. 7 is a flowchart for explaining the sequence of processing to quantitatively evaluate fluctuations of color reproducibility for each device, and prioritize devices suited to output data. This processing is executed under overall control of the data processing unit 205. In the processing of FIG. 7, the office color MFP 101 which scans executes processes in S701 to S706 and S708 to S712. Devices A, B, and C serving as data receiving side when executing remote copying can be the high-end color MFP 102 and office color MFPs 103 and 104 shown in FIG. 1, respectively. In each of devices A, B, and C, the storage unit 202 stores in advance a calibration elapsed time, and a device fluctuation amount LUT representing the fluctuation amount of color reproducibility (fluctuation amount of the tint) when the calibration elapsed time is used as a reference. In response to a request from the office color MFP 101, devices A, B, and C transmit information on the device fluctuation amount LUT and calibration elapsed time to the office color MFP 101 (S707).

Device A shown in FIG. 7 comprises a time 716 elapsed after calibration executed by device A, and a device fluctuation amount LUT 713 representing the fluctuation amount of color reproducibility when the calibration elapsed time 716 is used as a reference. Device B comprises a time 717 elapsed after calibration executed by device B, and a device fluctuation amount LUT 714 representing the fluctuation amount of color reproducibility when the calibration elapsed time 717 is used as a reference. Device C comprises a time 718 elapsed after calibration executed by device C, and a device fluctuation amount LUT 715 representing the fluctuation amount of color reproducibility when the calibration elapsed time 718 is used as a reference.

(Description of Device Fluctuation Amount LUT)

Before a description of each process in the flowchart of FIG. 7, the device fluctuation amount LUT will be explained with reference to FIG. 8. The device fluctuation amount LUT takes the form of a 3D lookup table (3D-LUT). A general 3D-LUT is used to convert a specific color space into another one. In the embodiment, however, the 3D-LUT represents the fluctuation amount (fluctuation range) of the tint after a predetermined elapsed time. For example, a device fluctuation amount LUT 801 (FIG. 8) exemplifies the fluctuation amount of the tint an elapsed time (reference time) of five days after the latest executed calibration. When RGB=(0,0,17) is input data, the fluctuation amount of the tint fluctuates within the range of ±10 for L*, fluctuates within the range of ±20 for B*, and stays 0 for A*. The device fluctuation amount LUT has different values for each device.

(Method of Generating Device Fluctuation Amount LUT)

A method of generating a device fluctuation amount LUT will be explained. R, G, and B data for generating a device fluctuation amount LUT are prepared. The R, G, and B data can be common R, G, and B data obtained in S304 of FIG. 3. The R, G, and B data serve as 3D information on the input side of the device fluctuation amount LUT 801.

In color conversion processing 2 (second color conversion processing) in S308 of FIG. 3, the R, G, and B data are converted into C, M, Y, and K (multilevel) data, outputting the C, M, Y, and K (multilevel) data. Based on the output results, L*, a*, and b* in a device-independent color space are measured using a calorimeter (first measurement result). The first measurement result corresponds to a measurement result immediately after the latest executed calibration, and is data free from any fluctuation of the tint over time.

The device operates for a predetermined period (reference time) while no calibration is done, and then outputs similar data. Based on the output results, L*, a*, and b* in the device-independent color space are measured using the calorimeter (second measurement result).

The absolute value (|(first measurement result)−(second measurement result)|) of the difference between the two measurement results is calculated. The absolute value of the difference is the fluctuation amount of the tint the time (reference time) after the latest executed calibration. The data processing unit 205 stores this value on the output side of the device fluctuation amount LUT. Although the output side of the device fluctuation amount LUT is the measurement result of the device-independent color space L*a*b*, it may also be the measurement result of another color space such as XYZ, CMY, or L*u*v*. A higher-accuracy device fluctuation amount LUT can also be generated by performing the same processing in a plurality of devices, and taking the average or maximum value to generate a device fluctuation amount LUT.

Referring back to FIG. 7, the sequence of concrete processing will be explained. In step S702, the data processing unit 205 controls the image reading unit 201 to read a document 701 and obtain data.

In step S703, the data processing unit 205 executes scanner image processing. This processing is the same as that in S301 to S304 of FIG. 3.

In step S704, the data processing unit 205 performs image area separation processing. The data processing unit 205 extracts the edge of image data, and checks whether each pixel of the image data represents a character or photograph.

In step S705, the data processing unit 205 counts the R, G, and B values of non-character pixels, and extracts R, G, and B values with high frequency of appearance from them. The data processing unit 205 stores the R, G, and B values with high frequency of appearance in the storage unit 202 (S706). As the method of counting R, G, and B values, when the gradation is expressed by 8 bits (0 to 255), R, G, and B values can be counted by, e.g., all the number of gradation levels to extract R, G, and B values with high frequency of appearance. In this case, data in a specific range can also be counted as one data, instead of counting data by all the number of gradation levels. For example, when data are counted at intervals of 32 within the range of 0 to 255 and data in each range is handled as one data, the data amount can be reduced. In the first embodiment, image area separation processing is done to count the R, G, and B values of non-character pixels and extract R, G, and B values with high frequency of appearance. This is because it is checked that color reproducibility is more important for photographic data than for character data. If photographic data does not put importance on color reproducibility, segmentation using image area separation processing need not be done.

In S708, the data processing unit 205 requests, of devices A, B, and C connected to the network 106, information on the device fluctuation amount LUTs and calibration elapsed times of the respective devices. The data processing unit 205 receives the device fluctuation amount LUTs 713, 714, and 715 and calibration elapsed times 716, 717, and 718 transmitted (S707) from the respective devices in response to the request. The data processing unit 205 generates new device fluctuation amount LUTs on the basis of the received device fluctuation amount LUTs 713, 714, and 715 and calibration elapsed times 716, 717, and 718. The new device fluctuation amount LUT is generated as data which interpolates the fluctuation amount of color reproducibility in accordance with the ratio of the calibration elapsed time (reference time) and the time elapsed up to the current time after executing calibration. Based on the interpolation result, the data processing unit 205 can calculate the fluctuation amount of the image quality for image data to be output.

Figure 9:
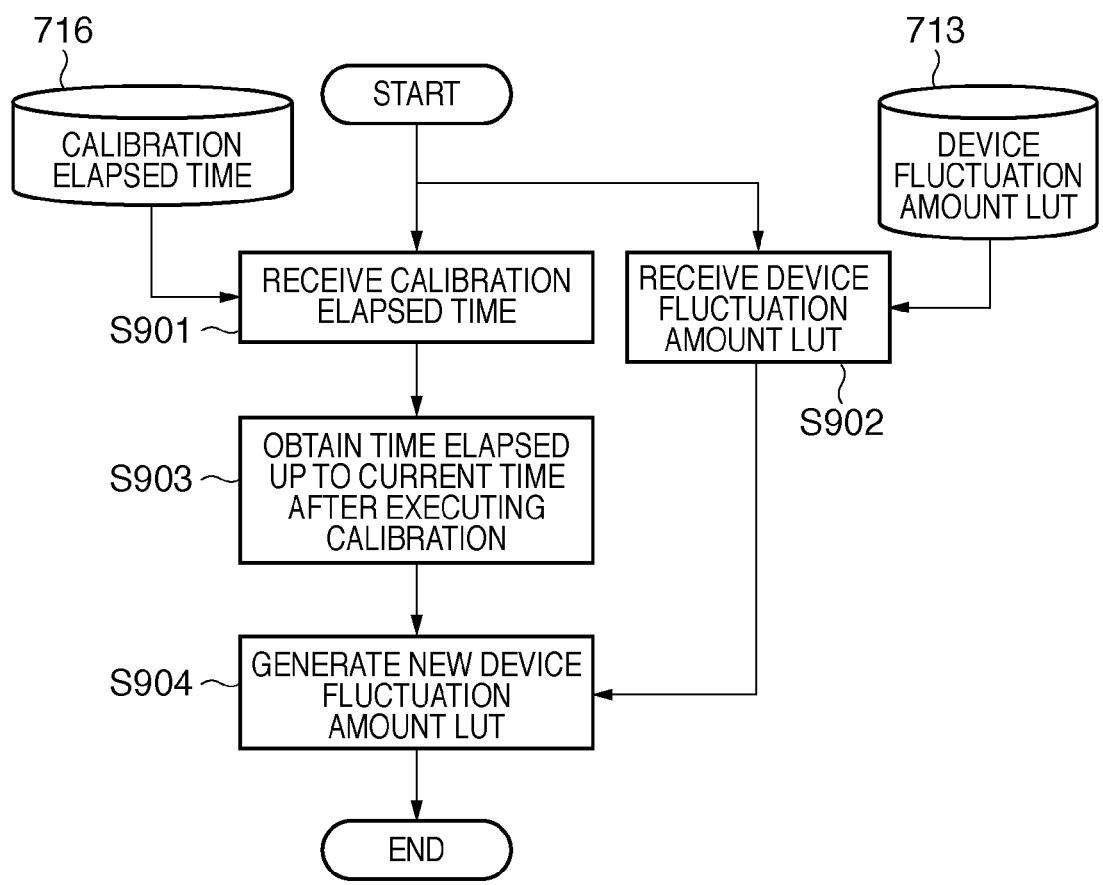
FIG. 9 is a flowchart for explaining the sequence of concrete processing in step S708.

FIG. 9 is a flowchart for explaining the sequence of concrete processing in step S708. This processing is executed under overall control of the data processing unit 205. For descriptive convenience, a device serving as the data receiving side is one device A.

In step S901, the data processing unit 205 receives the calibration elapsed time 716 transmitted from device A.

In step S902, the data processing unit 205 receives the device fluctuation amount LUT 713 transmitted from device A.

In step S903, based on information of the current time measured by a timer (not shown) capable of measuring the year, month, day, and time, the data processing unit 205 obtains the time elapsed up to the current time after executing calibration.

In step S904, the data processing unit 205 calculates a new device fluctuation amount LUT. The data processing unit 205 can calculate the new device fluctuation amount LUT:

new device fluctuation amount LUT=device fluctuation amount LUT×elapsed time/reference time (1)

When the elapsed time coincides with the reference time, the new device fluctuation amount LUT coincides with a device fluctuation amount LUT generated in advance. FIG. 10 is a table exemplifying a new device fluctuation amount LUT three days (elapsed time=three days) after calculation. Data on the output side of a new device fluctuation amount LUT 1001 is interpolation data obtained by multiplying, by ⅗, data (reference time=five days) on the output side of the device fluctuation amount LUT 801 shown in FIG. 8.

By this process, the processing (S708 in FIG. 9) to generate a new device fluctuation amount LUT ends. Referring back to FIG. 7, in step S709, the data processing unit 205 stores the new device fluctuation amount LUT generated in S708 in the storage unit 202. If there are a plurality of devices, new device fluctuation amount LUTs are generated for the respective devices and stored in the storage unit 202.

In step S710, the data processing unit 205 reads out the R, G, and B values (S706) with high frequency of appearance and the new device fluctuation amount LUTs (S709) which are stored in the storage unit 202. By using the new device fluctuation amount LUTs (S709), the data processing unit 205 converts the R, G, and B values (S706) with high frequency of appearance into data L*, a*, and b* representing the fluctuation amount of color reproducibility. By this conversion processing, the data processing unit 205 can calculate, based on the new device fluctuation amount LUT for each device, the fluctuation amount of the image quality with respect to image data to be output.

In step S711, based on the L*, a*, and b* values obtained as a result of the conversion processing, the data processing unit 205 calculates evaluation parameters for evaluating which fluctuation amount of color reproducibility is large/small. The data processing unit 205 sequentially adds the evaluation parameters to obtain their sum.

In calculating the sum of evaluation parameters, for example, the weight can be set in accordance with the frequency of appearance of color. Calculation of the sum of evaluation parameters based on L*, a*, and b* will be described in detail later with reference to FIG. 22. The data processing unit 205 similarly obtains the calculated evaluation parameter sum (addition result) for the new device fluctuation amount LUT of each device. A device having a small sum is one having the smallest fluctuation amount with respect to the read document 701.

In S712, the display unit 204 displays device names on a user interface (UI) in the ascending order of sum (addition result) of evaluation parameters based on the L*, a*, and b* values under display control of the data processing unit 205.

(Evaluation Parameter Calculation Processing (S710 to S712))

Figure 22:
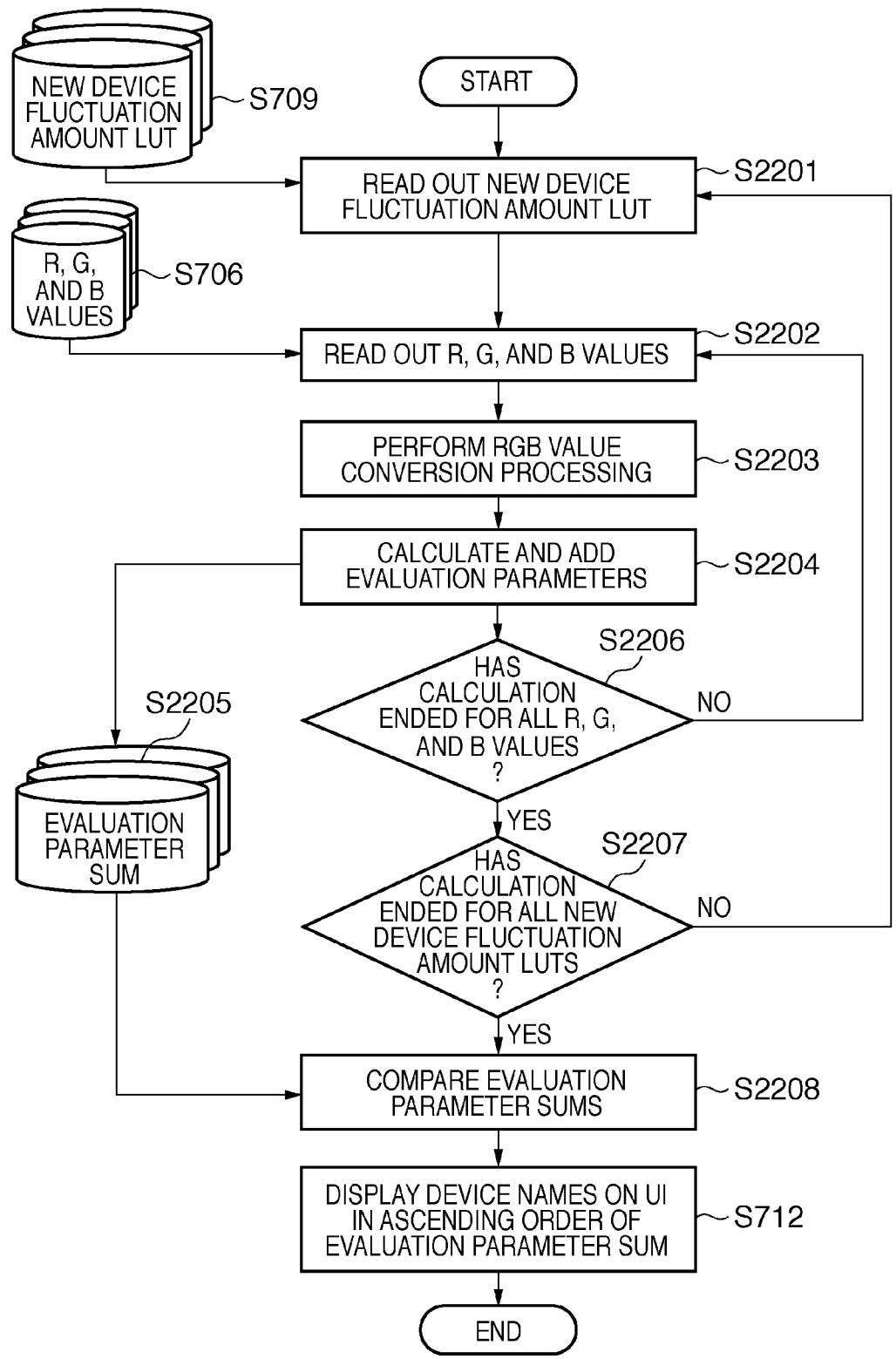
FIG. 22 is a flowchart for explaining concrete processing of processing in S710 to S712.

Practical processing of the processing in S710 to S712 shown in FIG. 7 will be explained with reference to FIG. 22. This processing is executed under overall control of the data processing unit 205.

In step S2201, the data processing unit 205 reads out one device fluctuation amount LUT (S709) stored in the storage unit 202. For example, when the storage unit 202 stores new device fluctuation amount LUT-A, LUT-B, and LUT-C corresponding to devices A, B, and C connected to the network 106, the data processing unit 205 selects and reads out one of these LUTs.

In step S2202, the data processing unit 205 reads out R, G, and B values (S706) stored in the storage unit 202.

In step S2203, the data processing unit 205 performs RGB value conversion processing for the R, G, and B values (S706) using the readout new device fluctuation amount LUT. The new device fluctuation amount LUT takes the form of a 3D-LUT, and outputs L*, a*, and b* values as fluctuation amounts of R, G, and B values in response to input R, G, and B values.

In step S2204, based on the L*, a*, and b* values obtained as a result of the conversion processing, the data processing unit 205 calculates, in accordance with equation (2) described below, evaluation parameters for evaluating which fluctuation amount of color reproducibility is large/small. Then, the data processing unit 205 sequentially adds the evaluation parameters calculated for the respective R, G, and B values, and stores the calculated evaluation parameter sum (addition result) in the storage unit 202 (S2205). The data processing unit 205 stores a device corresponding to the new device fluctuation amount LUT used for calculation in the storage unit 202 in correspondence with the evaluation parameter sum (addition result). This can make an evaluation parameter sum (addition result) correspond to a device.

$$\text{evaluation parameter} = \sqrt{L^{*2} + a^{*2} + b^{*2}} \quad (2)$$

In step S2206, the data processing unit 205 checks whether calculation has ended for all R, G, and B values. If the data processing unit 205 determines that no calculation has ended for all R, G, and B values (NO in S2206), the process returns to step S2202 to repeat the same processing. If the data processing unit 205 determines that calculation has ended for all R, G, and B values (YES in S2206), the process advances to step S2207.

In step S2207, the data processing unit 205 checks whether calculation has ended for all new device fluctuation amount LUTs. If the data processing unit 205 determines that no calculation has ended for all new device fluctuation amount LUTs (NO in S2207), the process returns to step S2201 to repeat the same processing. In S2201, the data processing unit 205 selects and reads out the next new device fluctuation amount LUT. The data processing unit 205 performs conversion processing for R, G, and B values read out in step S2202 by using the newly readout new device fluctuation amount LUT. The data processing unit 205 calculates evaluation parameters on the basis of L*, a*, and b* values obtained as a result of the conversion processing, sequentially adds them, and stores the evaluation parameter sums in the storage unit 202 (S2205). The storage unit 202 stores evaluation parameter sums calculated based on respective new device fluctuation amount LUTs.

If the data processing unit 205 determines that calculation has ended for all R, G, and B values (YES in S2206), and that calculation has ended for all new device fluctuation amount LUTs (YES in S2207), the process advances to step S2208.

In step S2208, the data processing unit 205 compares evaluation parameter sums (addition results) which are calculated based on the respective new device fluctuation amount LUTs and stored in the storage unit 202. The data processing unit 205 checks which evaluation parameter sum (addition result) is large/small.

Based on the check result in S2208, the display unit 204 displays device names on a user interface (UI) in the ascending order of evaluation parameter sum under display control of the data processing unit 205 (S712).

The first embodiment can quantitatively evaluate the fluctuation amount of each device for a specific color with high frequency of appearance in a document.

In the first embodiment, calculated evaluation parameters are uniformly added. It is also possible to, for example, reflect information on the frequency of appearance in the evaluation parameter sum (addition result) by multiplying evaluation parameters by weighting factors corresponding to the frequencies of appearance of R, G, and B.

The user can select a device having a smallest fluctuation amount by referring to device names displayed on the UI by the processing of S712. When the user selects a device from those displayed on the UI, data is transmitted to the selected device under the control of the data processing unit 205.

Upon receiving the data, the device executes printer image processing (S308 to S313 in FIG. 3) similarly to general remote copy processing. At this time, the data processing unit 205 can also automatically transmit data to a device having the smallest evaluation parameter sum (addition result) without displaying a list of devices.

(Example of UI Window Display)

Figure 11:
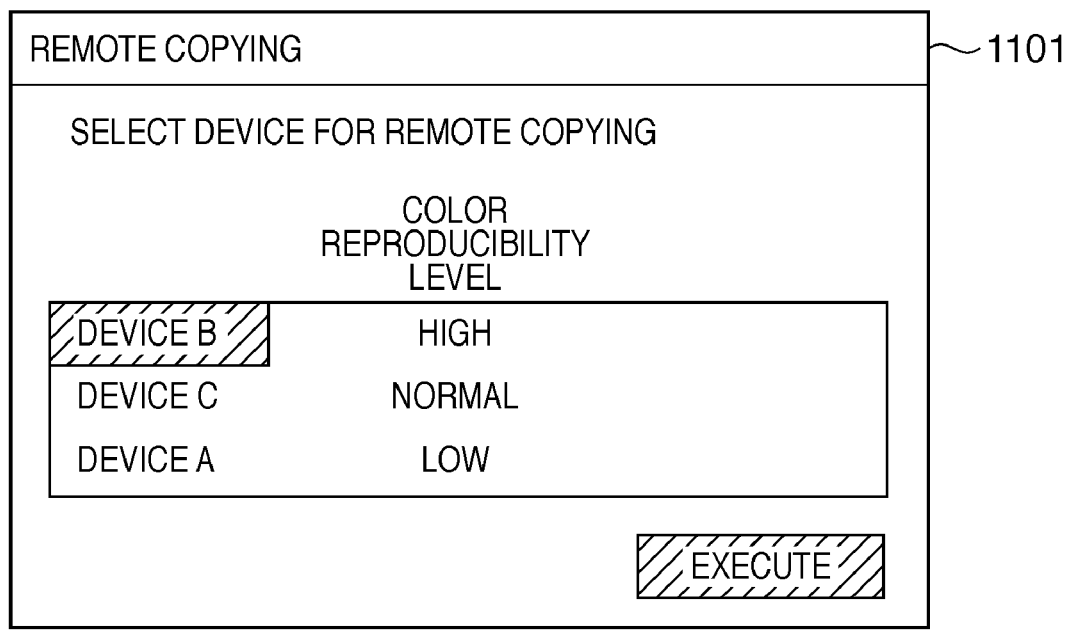
FIG. 11 is a view exemplifying a UI window when executing remote copying.

FIG. 11 is a view exemplifying a UI window 1101 when executing remote copying. When selecting a device capable of remote copying by the user, the UI window displays a color reproducibility level. The color reproducibility level is displayed after divided into three levels by threshold processing for the evaluation parameter sum (addition result). The three levels are high≦(first threshold), first threshold<normal≦second threshold, and second threshold<low.

In this case, a "high" device means a device having a highest color reproducibility level in remote copy processing. The color reproducibility level in remote copy processing becomes lower in the order of a "normal" device and "low" device.

In the UI window 1101 shown in FIG. 11, the order of color reproducibility level is device B, device C, and device A. Device B is displayed as a device having top priority suitable for remote copy processing.

The first embodiment targets a full-color document, but the document may also be monochrome or bicolor. When the embodiment targets only a monochrome document, for example, a single-color device fluctuation amount LUT as denoted by reference numeral 2101 in FIG. 21 is also available. In this case, a necessary LUT takes the form of a 1D lookup table, and the output suffices to be only the luminance value (fluctuation amount of luminance information). Hence, the storage capacity of the storage unit 202 can be reduced.

According to equation (1), a new device fluctuation amount LUT is calculated based on the calibration elapsed time, but the purpose of the present invention is not limited to this example. For example, a new device fluctuation amount LUT can also be calculated based on the number of print sheets (reference number of sheets) used as a reference when generating a device fluctuation amount LUT, and the number of print sheets printed out after calculation:

new device fluctuation amount LUT=device fluctuation amount LUT×number of print sheets printed out after calculation/reference number of sheets    (3)

Alternatively, a new device fluctuation amount LUT can also be calculated based on the relationship between the temperature (reference temperature) of a device installation place used as a reference when generating a device fluctuation amount LUT, and the temperature when the device is used:

new device fluctuation amount LUT=device fluctuation amount LUT×temperature when device is used/reference temperature    (4)

In the first embodiment, devices on the receiving side that receive data comprise device fluctuation amount LUTs. Alternatively, a device on the data transmitting side may also comprise the device fluctuation amount LUTs of respective devices on the receiving side. In this case, the device on the data transmitting side suffices to receive the calibration elapsed times 716, 717, and 718 from the devices on the receiving side.

The first embodiment pays attention to "tint" as the fluctuation amount of a device. It is also possible to form fluctuation amounts of color misregistration of a printer corresponding to R, G, and B values into an LUT, and quantize the fluctuation amounts.

According to the first embodiment, the user can select a device having a small fluctuation amount of color reproducibility in accordance with the frequencies of appearance of R, G, and B values in a document.

Second Embodiment

The second embodiment considering the color reproduction range of a device will be described. The first embodiment has described an arrangement capable of selecting a device having a small fluctuation amount of color reproducibility level in remote copying. The second embodiment will describe an arrangement which further considers the color reproduction range of a selectable device.

The first embodiment pays attention to the fluctuation amount of color reproducibility in each device. In practice, each device has a different color reproduction range. In general, a high-end device has a wide color reproduction range, and an office device has a narrow color reproduction range. Thus, a color reproducible by a high-end device cannot be reproduced by an office device. In this case, it is desirable for the user to output data not by an office device incapable of reproducing the color, but by a high-end device capable of reproducing it even if the tint has fluctuated. The second embodiment will explain the sequence of processing when a color reproducible by only a specific device is extracted in RGB value extraction processing.

Figure 14:
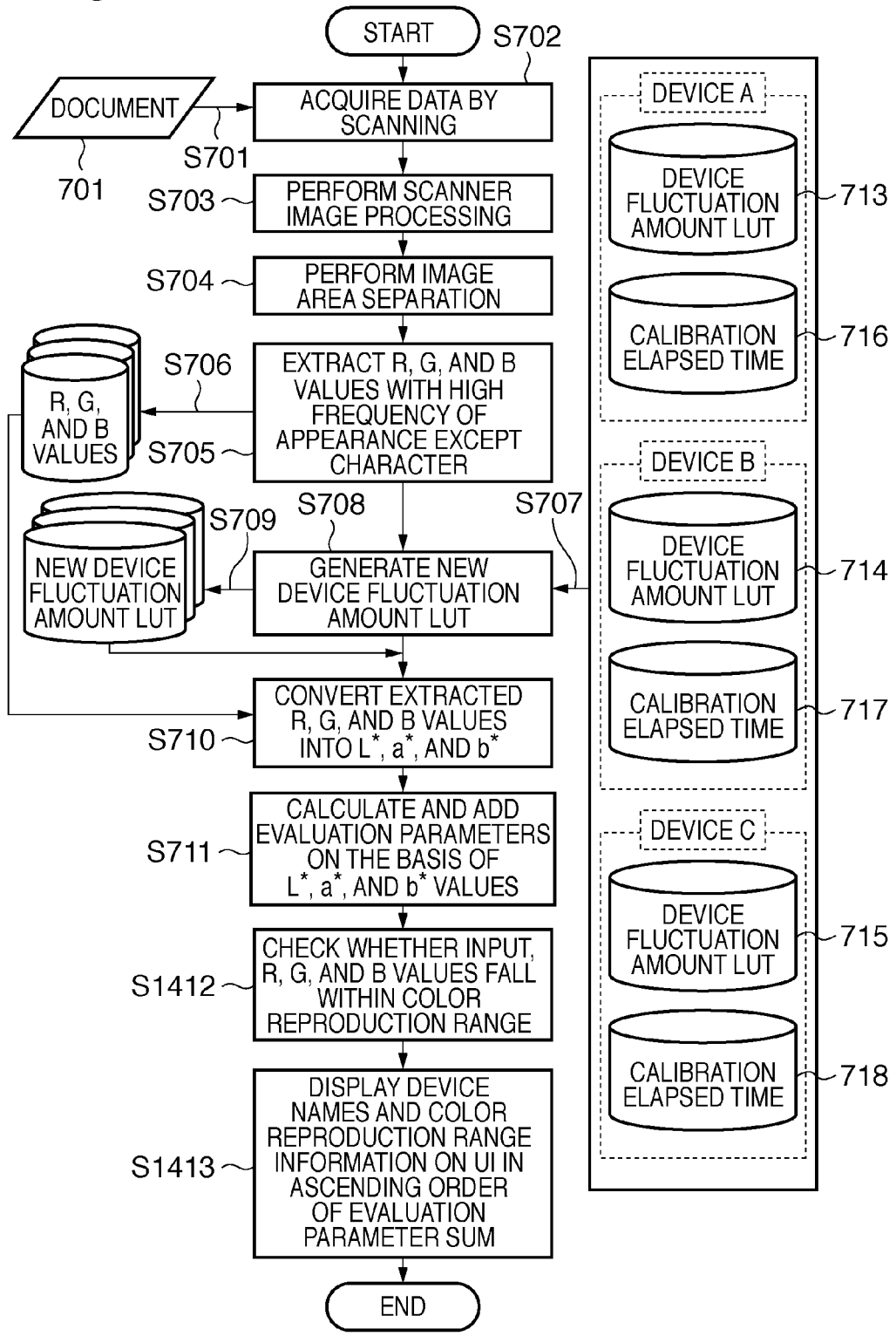
FIG. 14 is a flowchart for explaining the sequence of processing in the second embodiment.

FIG. 14 is a flowchart for explaining the sequence of processing in the second embodiment.

The processing is the same as that in the flowchart of FIG. 7 except steps S1412 and S1413. A description of the same processing steps as those in FIG. 7 will not be repeated.

A case where a color (RGB=(255,255,0)) reproducible by only a high-end device is extracted in processing to extract R, G, and B values in S705 will be explained.

In new device fluctuation amount LUT generation processing of S708, a data processing unit 205 sets an extremely large conversion value for data exceeding the color reproduction range in order to reflect an abnormal state in an evaluation parameter calculation result.

FIG. 12 is a table exemplifying the device fluctuation amount LUTs of a high-end device (high-end color MFP) and office device (office color MFP). In FIG. 12, reference numeral 1201 denotes a device fluctuation amount LUT for the high-end color MFP; 1202, a device fluctuation amount LUT for the office color MFP. R, G, and B values displayed in a range of RGB=(0,0,0) to (204,255,0) are data which fall within the color reproduction ranges of both the high-end color MFP and office color MFP.

A color expressed by RGB=(255,255,0) is data which falls within the color reproduction range of the high-end color MFP, but exceeds that of the office color MFP. Based on the device fluctuation amount LUT 1201, the color expressed by RGB=(255,255,0) is converted into L*a*b*=(10,0,20) as an output from the device fluctuation amount LUT 1201 for the high-end color MFP. To the contrary, the color expressed by RGB=(255,255,0) is converted into an extremely large numerical value L*a*b*=(100,256,256) as an output from the device fluctuation amount LUT 1202 for the office color MFP.

Based on the converted L*, a*, and b* values, the data processing unit 205 calculates evaluation parameters for evaluating the fluctuation amount, and obtains the sum of evaluation parameters (S711). The sum of evaluation parameters exceeding the color reproduction range in the office color MFP becomes larger than that of evaluation parameters in the high-end color MFP. For this reason, the priority of the office color MFP becomes lower than that of the high-end color MFP.

In step S1412, the data processing unit 205 checks whether input, R, G, and B values fall within the color reproduction range. In this case, a specific threshold is set, and if the input, R, G, and B values are equal to or smaller than the threshold, the data processing unit 205 determines that the data falls within the color reproduction range. If the input, R, G, and B values are larger than the threshold, the data processing unit 205 determines that the data exceeds the color reproduction range.

In step S1413, a display unit 204 displays device names on a user interface (UI) in the ascending order of evaluation parameter sum (addition result) under display control of the data processing unit 205. For a device in which a color exceeds the color reproduction range, evaluation parameters are calculated based on large conversion values. Thus, when evaluation parameter sums are compared, the priority of the office color MFP becomes lower than that of the high-end color MFP.

Further, the display unit 204 displays the check result (S1412) of color reproduction capability on the UI in combination with display of the priority order based on the color reproducibility level under display control of the data processing unit 205.

FIG. 13 is a view exemplifying a UI window 1301 displayed by the processing of S1413. The UI window 1301 shows that only device B (high-end color MFP) can reproduce the color of an input document. The device fluctuation amount LUTs of devices A and B (office color MFPs) set extremely large values for the R, G, and B values of the input document, and their priority is lower than that of device B. The UI window 1301 also shows that devices A and C (office color MFPs) cannot reproduce the color.

According to the second embodiment, even when devices having different color reproduction ranges coexist, the user can select a device capable of reproducing the R, G, and B values of a document.

Third Embodiment

The first embodiment has described an arrangement capable of selecting a device having a small fluctuation amount of color reproducibility level in remote copying. The third embodiment will exemplify a case where devices are sorted using device information when they have the same evaluation parameter sum.

Figure 15:
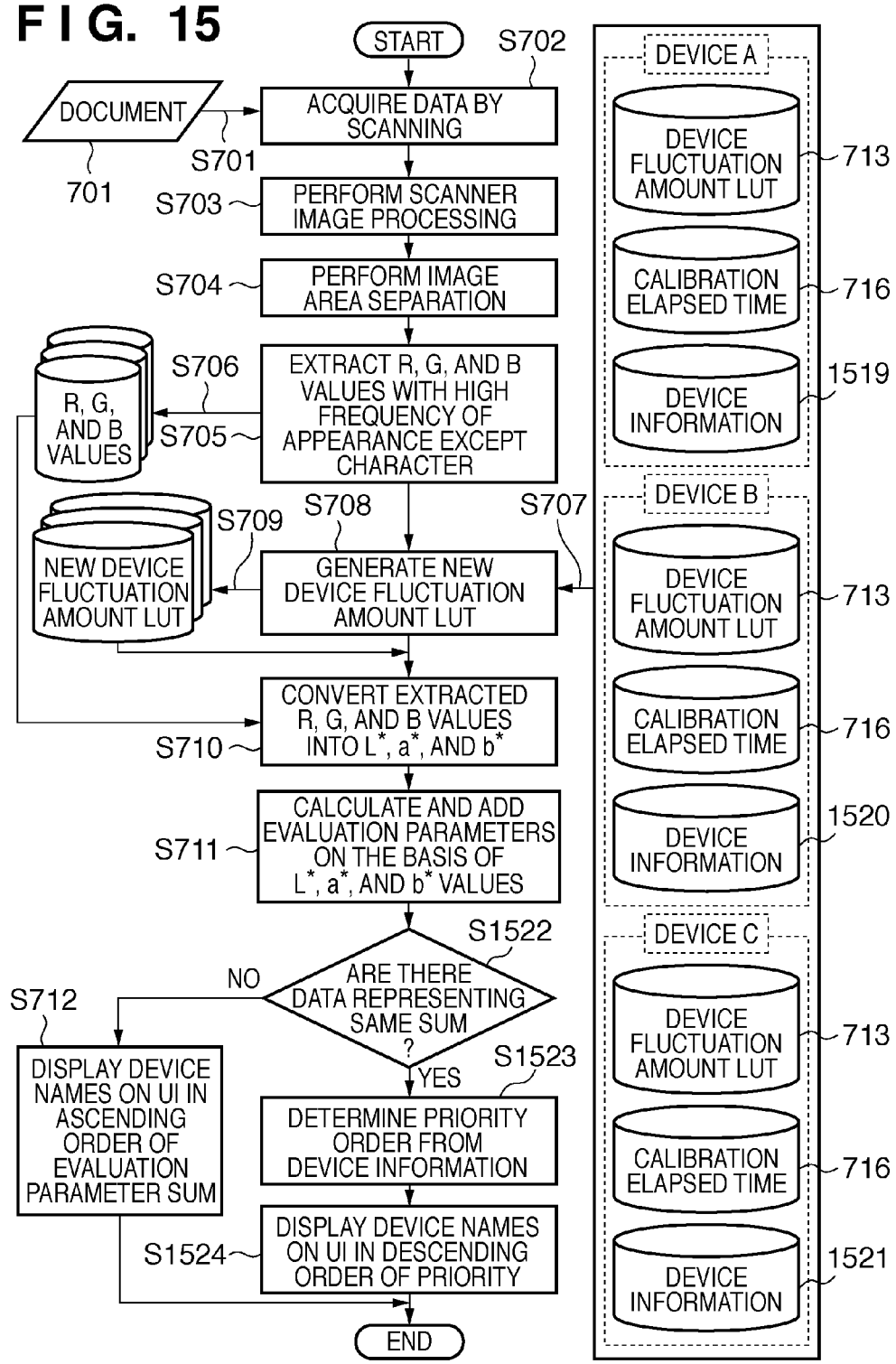
FIG. 15 is a flowchart for explaining the sequence of processing in the third embodiment.

FIG. 15 is a flowchart for explaining the sequence of processing in the third embodiment. The processing is the same as that in the flowchart of FIG. 7 except steps S1522 to S1524. A description of the same processing steps as those in FIG. 7 will not be repeated.

Devices A, B, and C comprise pieces of device information 1519 to 1521 in addition to device fluctuation amount LUTs 713 to 715 and calibration elapsed times 716 to 718. In S707, devices A, B, and C transmit, to an office color MFP 101, information on the device fluctuation amount LUTs and calibration elapsed times in response to a request from the office color MFP 101. At this time, devices A, B, and C also transmit the pieces of device information 1519 to 1521 to the office color MFP 101. The device information is used to evaluate the device performance. For example, as for the print speed, the number of output sheets per sec can be adopted as the device information. Information on the print quality such as the print resolution can also be employed as the device information.

After calculating the sum of evaluation parameters in step S711, a data processing unit 205 checks in step S1522 whether there are data representing the same evaluation parameter sum among devices A, B, and C. If the data processing unit 205 determines in S1522 that there are no data representing the same evaluation parameter sum (NO in S1522), the process advances to step S712. In S712, a display unit 204 displays device names on a user interface (UI) in the ascending order of sum (addition result) of evaluation parameters based on L*, a*, and b* values under display control of the data processing unit 205. Then, the process ends.

If the data processing unit 205 determines in S1522 that there are data representing the same evaluation parameter sum (YES in S1522), the process advances to step S1523. In S1523, the data processing unit 205 specifies devices having the same evaluation parameter sum. The data processing unit 205 can specify a device from a device name corresponding to a new device fluctuation amount LUT. The data processing unit 205 compares pieces of device information corresponding to the specified devices, determining the priority order of the devices. Based on the device information representing the device performance, the data processing unit 205 determines the priority order of the devices having the same evaluation parameter sum. For example, when the device information is "the number of output sheets per sec" (print speed), the data processing unit 205 prioritizes devices in the descending order of number of output sheets per unit time. When the device information is "print resolution" (print quality), the data processing unit 205 prioritizes devices in the descending order of resolution.

In S1524, the display unit 204 displays device names on the user interface (UI) in the descending order of priority in accordance with the priority order determined in S1523 under display control of the data processing unit 205.

FIG. 16 is a view exemplifying a UI window 1601 displayed by the processing of S1524. Devices A, B, and C are devices on the data receiving side. Of these devices, devices B and C have the same evaluation parameter sum. The data processing unit 205 of a device serving as the data transmitting side compares pieces of device information transmitted from devices B and C, determining the priority order of the devices. In this case, the number of output sheets per unit time (1 sec) is 70 for device B and 30 for device C. The priority of device B having a larger number of output sheets per unit time is set higher than that of device C. Device A has a larger evaluation parameter sum than that of devices B and C, and is determined as a device having lowest priority. As for device A, the UI window 1601 displays a combination of the evaluation parameter sum and device information on the number of output sheets per unit time.

In the third embodiment, devices A, B, and C on the data receiving side comprise device information. However, the present invention is not limited to this arrangement, and a device on the data transmitting side can also comprise device information.

According to the third embodiment, for devices having the same color reproducibility level, the priority order of devices to be selected can be determined based on device information representing the device performance.

Fourth Embodiment

The first embodiment has described an arrangement capable of selecting a device having a small fluctuation amount of color reproducibility level in remote copying. The fourth embodiment will exemplify an application of driver output.

Figure 17:
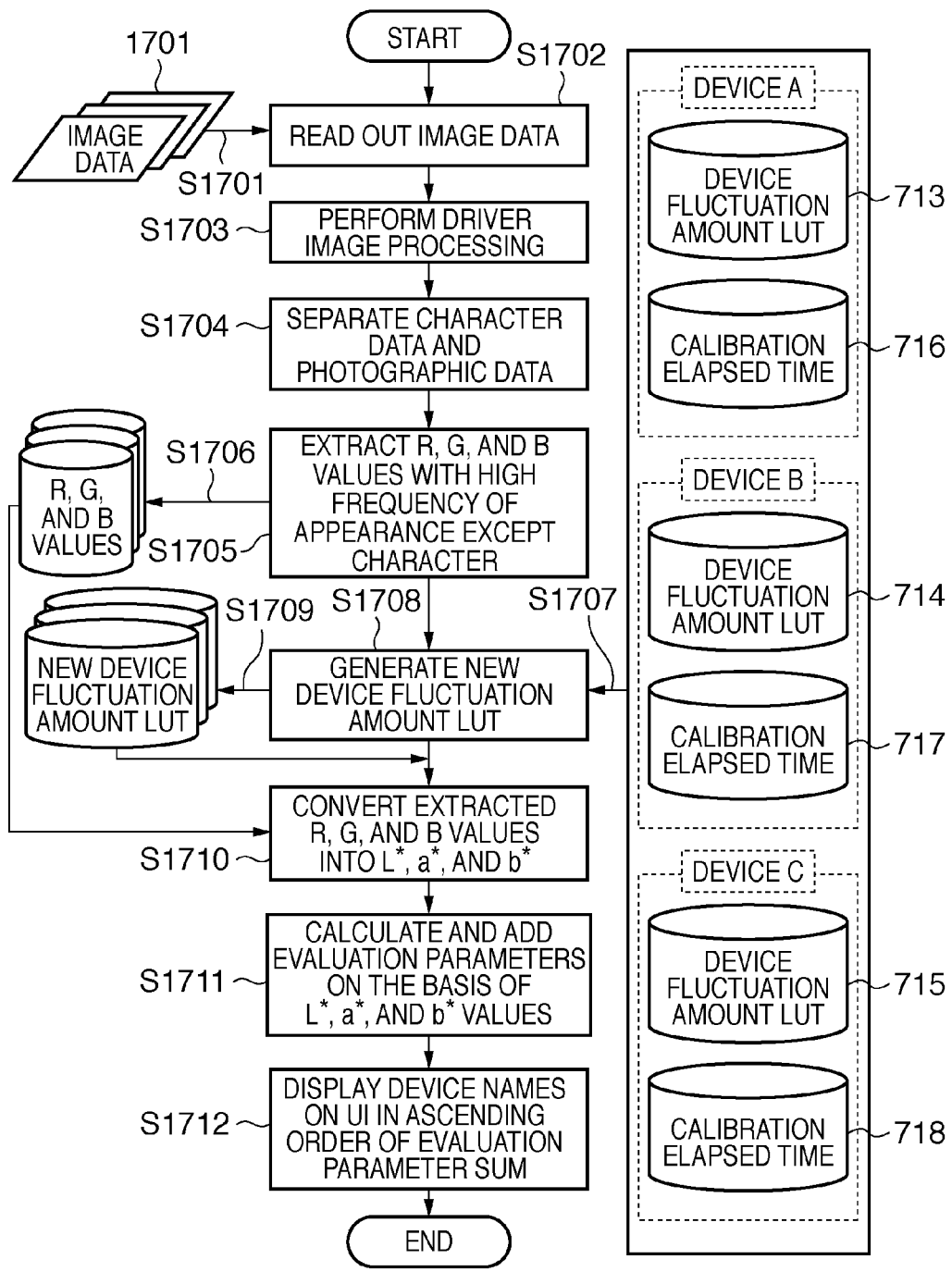
FIG. 17 is a flowchart for explaining the sequence of processing in the fourth embodiment.

FIG. 17 is a flowchart for explaining the sequence of processing in the fourth embodiment. In the first embodiment, a device (e.g., the office color MFP 101 in FIG. 1) on the data transmitting side executes S701 to S706 and S708 to S712 in FIG. 7. In the fourth embodiment, an information processing apparatus (PC) executes corresponding processes. In this processing, the CPU (not shown) of the PC functions as a data processing means for executing data processing.

In step S1702, image data 1701 generated by an application or the like is read. Unlike a document, one data may include a plurality of pages. When there are a plurality of pages, the processing is applicable by executing the same processing for each page.

In step S1703, driver image processing is executed for the read image data under the control of the CPU. The driver image processing corresponds to S315 to S318 in FIG. 3. In step S1704, image area separation processing is done to separate character data and photographic data using information obtained from the application.

In step S1705, the CPU counts the R, G, and B values of non-character pixels, and extracts R, G, and B values with high frequency of appearance from them. The CPU stores the R, G, and B values with high frequency of appearance in a storage unit 202 (S1706).

In S1708, the CPU requests, of devices A, B, and C connected to a network 106, information on the device fluctuation amount LUTs and calibration elapsed times of the respective devices. The CPU receives device fluctuation amount LUTs 713, 714, and 715 and calibration elapsed times 716, 717, and 718 transmitted (S1707) from the respective devices in response to the request. The CPU generates new device fluctuation amount LUTs on the basis of the received device fluctuation amount LUTs 713, 714, and 715 and calibration elapsed times 716, 717, and 718.

In step S1709, the CPU stores the new device fluctuation amount LUTs generated in S1708 in the storage unit 202.

In step S1710, the CPU reads out the R, G, and B values (S1706) and the new device fluctuation amount LUTs. By using the new device fluctuation amount LUTs, the CPU converts the R, G, and B values with high frequency of appearance into data $L^*$, $a^*$, and $b^*$ representing the fluctuation amount of color reproducibility.

In step S1711, based on the $L^*$, $a^*$, and $b^*$ values obtained as a result of the conversion processing, the CPU calculates evaluation parameters for evaluating which fluctuation amount of color reproducibility is large/small. The CPU sequentially adds the evaluation parameters to obtain their sum.

In S1712, the display unit of the information processing apparatus (PC) displays device names on a UI window in the ascending order of sum of evaluation parameters based on the $L^*$, $a^*$, and $b^*$ values under display control of the CPU. Then, the process ends. This UI window is, e.g., one described in the first embodiment.

According to the fourth embodiment, when performing driver output from a PC, the user can select a device having a small fluctuation amount of color reproducibility in accordance with the frequencies of appearance of R, G, and B values in image data.

Fifth Embodiment

In the first to fourth embodiments, R, G, and B data with high frequency of appearance are extracted from the R, G, and B data of a document or image data, and processed. The fifth embodiment will explain an arrangement capable of selecting a device suited to user designation on the basis of information on a color designated by the user in order to emphasize the reproducibility of a specific color.

Figure 19:
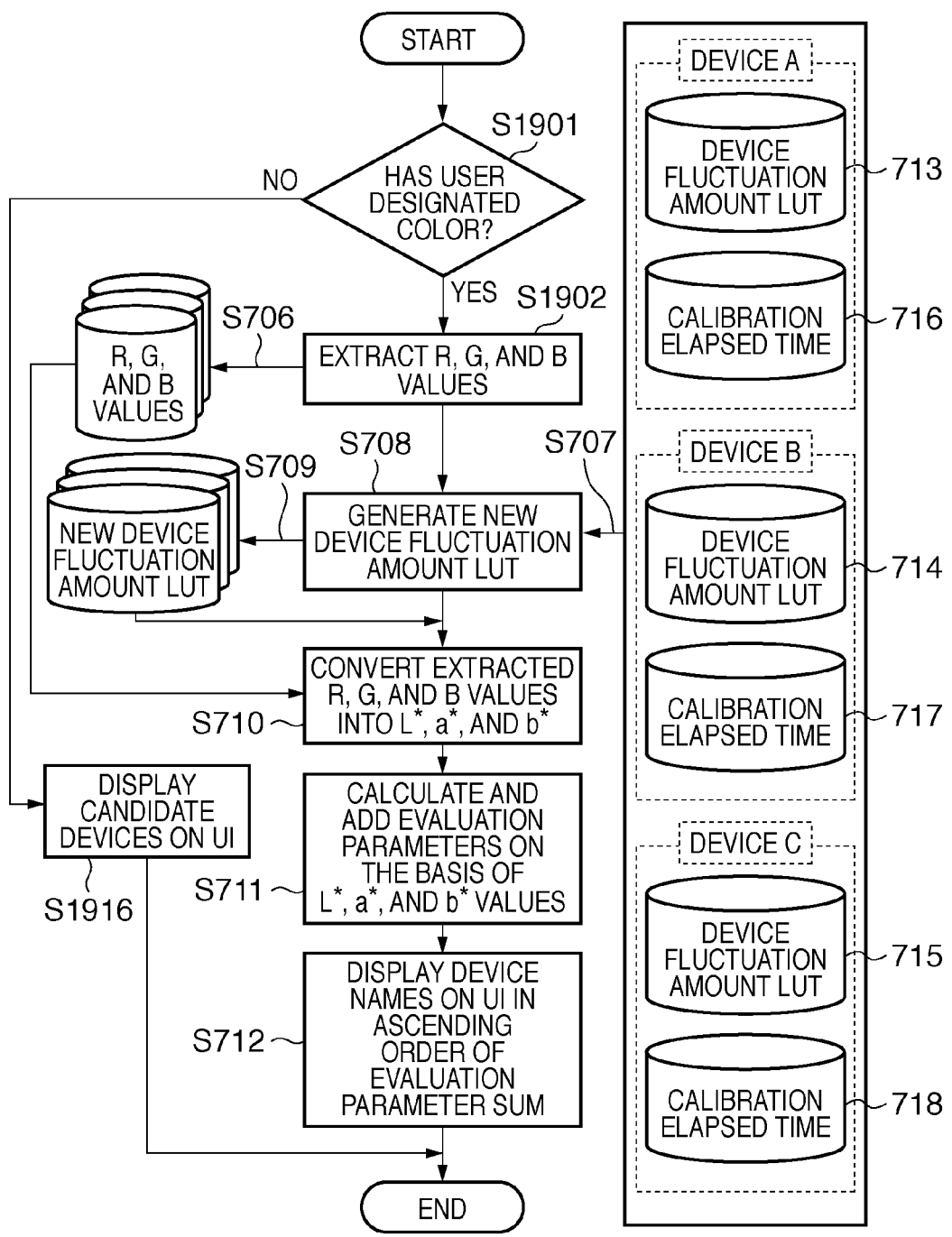
FIG. 19 is a flowchart for explaining the sequence of processing in the fifth embodiment.

FIG. 18 is a view exemplifying a UI window 1801 for accepting designation of a specific color in order to emphasize the reproducibility of the specific color before executing scanning. In the UI window 1801, each of red, green, blue, cyan, magenta, yellow, and black is divided into light and dark colors. The user can designate, among these colors, a color which puts importance on reproducibility. In the UI window 1801, the user checks light green, light blue, and light cyan. These colors are designated to emphasize reproducibility. When the user ends designation and presses an Execute button 1802, the user designation is finalized to execute scanner image processing. The scanner image processing corresponds to S301 to S304 in FIG. 3. After performing the scanner image processing, processing is executed according to the flowchart shown in FIG. 19. This processing is executed under the control of a data processing unit 205. In the flowchart of FIG. 19, the same step numbers as those in the flowchart of FIG. 7 denote the same processes, and a detailed description thereof will not be repeated.

In step S1901, the data processing unit 205 checks whether the user has designated, in the UI window 1801, a color to be reproduced. If the data processing unit 205 determines that the user has not designated any color (NO in S1901), the process advances to S1916. In S1916, a display unit 204 displays a list of devices subjected to remote copying in the UI window according to a predetermined rule under display control of the data processing unit 205. Then, the process ends.

If the data processing unit 205 determines that the user has designated a color (YES in S1901), the process advances to step S1902.

In step S1902, the data processing unit 205 extracts R, G, and B values on the basis of the information designated in the UI window 1801 for accepting designation of a color which puts importance on reproducibility. As a method of extracting R, G, and B values for emphasizing the reproducibility of a specific color, for example, a plurality of color candidate data corresponding to each color in the UI window 1801 may also be prepared in a table 2001 shown in FIG. 20. The table 2001 is looked up when extracting R, G, and B values. A storage unit 202 stores the table 2001 shown in FIG. 20 so that the data processing unit 205 can look it up. The table 2001 stores color candidates 1, 2, and 3, and a color candidate corresponding to a color selected by the user is read out. In this case, color candidates 1 to 3 are prepared, but the number of color candidates is arbitrary. The table 2001 defines color candidates 1 to 3 for all colors, but the number of color candidates may also change in accordance with the color such as "light red" or "dark red". When executing RGB value extraction processing, the data processing unit 205 reads out all the R, G, and B values of color candidates 1, 2, and 3 of a corresponding color on the basis of the user designation. For example, when the user selects "light red", color candidate 1 (255,240,240), color candidate 2 (255,220,220), and color candidate 3 (255,200,200) are read out. When the user designates a plurality of colors, all color candidates 1 to 3 corresponding to the respective colors are read out. The storage unit 202 stores the R, G, and B values extracted by the processing of S1902 (S706).

In S708, the data processing unit 205 generates new device fluctuation amount LUTs on the basis of device fluctuation amount LUTs 713, 714, and 715 and calibration elapsed times 716, 717, and 718.

In step S709, the data processing unit 205 stores the new device fluctuation amount LUTs generated in S708 in the storage unit 202.

In step S710, the data processing unit 205 reads out the R, G, and B values of a plurality of color candidates corresponding to the color selected by the user and the new device fluctuation amount LUTs which are stored in the storage unit 202. By using the new device fluctuation amount LUTs, the data processing unit 205 converts the R, G, and B values extracted by the processing of S1902 into data $L^*$, $a^*$, and $b^*$ representing the fluctuation amount of color reproducibility.

In step S711, based on the $L^*$, $a^*$, and $b^*$ values obtained as a result of the conversion processing, the data processing unit 205 calculates, according to, e.g., equation (2), evaluation parameters for evaluating which fluctuation amount of color reproducibility is large/small. The data processing unit 205 sequentially adds the evaluation parameters to obtain their sum. In this case, the maximum value, average, or the like is also available instead of the sum.

In S712, the display unit 204 displays device names on a user interface (UI) in the ascending order of sum of evaluation parameters based on the L*, a*, and b* values under display control of the data processing unit 205. Then, the process ends. The UI window displays evaluation results reflecting designation of the color by the user.

The fifth embodiment has exemplified remote copying. However, even when performing driver output, designation of a color by the user can be reflected in fluctuation evaluation of color reproducibility. According to the fifth embodiment, the user can select a device having a small fluctuation amount of color reproducibility in accordance with the frequencies of appearance of R, G, and B values reflecting designation of a color by the user.

Other Embodiments

The object of the present invention is also achieved by supplying a computer-readable storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-307895, filed Nov. 28, 2007, which is hereby incorporated by reference herein in its entirety.

What is claimed is:

1. An image processing apparatus comprising:
an interpolation unit configured to interpolate an image quality fluctuation amount for each of a plurality of image forming devices capable of outputting image data, based on a result of forming an image when executing calibration and a result of forming an image after executing calibration;
a calculation unit configured to calculate, for each of the plurality of image forming devices on the basis of the interpolation result of said interpolation unit, an image quality fluctuation amount for image data to be output;
a determination unit configured to determine a priority order of the plurality of image forming devices as output destinations of the image data on the basis of the calculated image quality fluctuation amounts; and
a display unit configured to display a list of image forming devices selectable from the plurality of image forming devices in accordance with the priority order determined by said determination unit.

2. The apparatus according to claim 1, further comprising an extraction unit configured to extract R, G, and B values with high frequency of appearance from color image data to be output.

3. The apparatus according to claim 2, wherein said calculation unit is operable to calculate fluctuation amounts of the R, G, and B values on the basis of a 3D lookup table in which the R, G, and B values extracted by said extraction unit are inputs, and the fluctuation amount interpolated by said interpolation unit is an output.

4. The apparatus according to claim 2, wherein
said extraction unit is operable to extract luminance information from monochrome image data to be output, and
said calculation unit is operable to calculate a fluctuation amount of the luminance information on the basis of a 1D lookup table in which the luminance information extracted by said extraction unit is an input, and the fluctuation amount interpolated by said interpolation unit is an output.

5. The apparatus according to claim 2, further comprising a check unit configured to check whether the R, G, and B values extracted by said extraction unit fall within a range reproducible by the plurality of image forming devices,
wherein said determination unit is operable to determine the priority order of the plurality of image forming devices on the basis of the calculation results of said calculation unit and the check result of said check unit.

6. The apparatus according to claim 1, further comprising an acquisition unit configured to acquire device information for evaluating performance of each of the plurality of image forming devices,
wherein when the calculation results of said calculation unit is the same for each of a plurality of image forming devices, said determination unit is operable to determine, based on the device information acquired by said acquisition unit, a priority order of the plurality of image forming devices whose calculation results are the same.

7. The apparatus according to claim 2, further comprising a designation unit configured to accept designation of a specific color to emphasize reproducibility of the specific color,
wherein when said designation unit is operable to designate the specific color, said extraction unit extracts a color candidate of a corresponding color from the color image data.

8. An image processing apparatus which is connectable to a plurality of image forming apparatuses via a network and which is operable to transmit image data to one of the plurality of image forming apparatuses, the image processing apparatus comprising:
an extraction unit configured to extract a color with high frequency of appearance from the image data;
a calculation unit configured to calculate, by using fluctuation amounts of tint of each color in the plurality of image forming apparatuses a reference time after executing calibration in the plurality of image forming apparatuses, and a time elapsed after calibration, a fluctuation amount of tint for each of the plurality of image forming apparatuses at a timing to transmit the image data; and
a display unit configured to display a fluctuation amount of a color with high frequency of appearance by using the fluctuation amount calculated by said calculation unit.

9. A control method of an image processing apparatus, the method comprising:

interpolating, based on a result of forming an image when executing calibration and a result of forming an image after executing calibration, a fluctuation amount of image quality of each of a plurality of image forming devices capable of outputting image data;

calculating, for each of the plurality of image forming devices on the basis of the interpolation result of the interpolation step, a fluctuation amount of image quality for image data to be output;

determining a priority order of the plurality of image forming devices as output destinations of the image data on the basis of calculation results of the calculation step; and displaying a list of image forming devices selectable from the plurality of image forming devices in accordance with the priority order determined in the determination step.

10. The method according to claim 9, further comprising extracting R, G, and B values with high frequency of appearance from color image data to be output.

11. The method according to claim 10, wherein in the calculation step, fluctuation amounts of the R, G, and B values are calculated based on a 3D lookup table in which the R, G, and B values extracted in the extraction step are inputs, and the fluctuation amount interpolated in the interpolation step is an output.

12. The method according to claim 10, wherein
in the extraction step, luminance information is extracted from monochrome image data to be output, and
in the calculation step, a fluctuation amount of the luminance information is calculated based on a 1D lookup table in which the luminance information extracted in the extraction step is an input, and the fluctuation amount interpolated in the interpolation step is an output.

13. The method according to claim 10, further comprising checking whether the R, G, and B values extracted in the extraction step fall within a range reproducible by the plurality of image forming devices, wherein in the determination step, the priority order of the plurality of image forming devices is determined based on the calculation results of the calculation step and the check result of the check step.

14. The method according to claim 9, further comprising acquiring device information for evaluating performance of each of the plurality of image forming devices, wherein in the determination step, when the calculation results of the calculation step coincide with each other between a plurality of image forming devices, a priority order of the plurality of image forming devices whose calculation results coincide with each other is determined based on the device information acquired in the acquisition step.

15. The method according to claim 10, further comprising accepting designation of a specific color to emphasize reproducibility of the specific color, wherein in the extraction step, when the specific color is designated in the designation step, a color candidate of a corresponding color are extracted from the color image data.

16. A control method of an image processing apparatus which is connected to a plurality of image forming apparatuses via a network and transmits image data to one of the plurality of image forming apparatuses, the method comprising:

extracting a color with high frequency of appearance from the image data;

calculating a fluctuation amount of tint for each of the plurality of image forming apparatuses at a timing to transmit the image data, by using fluctuation amounts of tint of each color in the plurality of image forming apparatuses a reference time after executing calibration in the plurality of image forming apparatuses, and a time elapsed after calibration; and displaying a fluctuation amount of a color with high frequency of appearance by using the fluctuation amount calculated in the calculation step.

17. A non-transitory computer-readable storage medium storing, in executable form, a program causing a computer to execute a control method of an image processing apparatus as claimed in claim 8.

* * * * *